United States Patent [19]

Nakagawa

[11] Patent Number: 5,730,940
[45] Date of Patent: *Mar. 24, 1998

[54] SCANNING PROBE MICROSCOPE AND MOLECULAR PROCESSING METHOD USING THE SCANNING PROBE MICROSCOPE

[75] Inventor: Tohru Nakagawa, Osaka, Japan

[73] Assignee: Matsushita Electric Industrial Co., Ltd., Osaka, Japan

[*] Notice: The term of this patent shall not extend beyond the expiration date of Pat. No. 5,353,632.

[21] Appl. No.: 340,866

[22] Filed: Nov. 15, 1994

Related U.S. Application Data

[62] Division of Ser. No. 875,694, Apr. 29, 1992, Pat. No. 5,363,697.

[30] Foreign Application Priority Data

| Apr. 30, 1991 | [JP] | Japan | 3-098919 |
| Apr. 30, 1991 | [JP] | Japan | 3-098920 |

[51] Int. Cl.$^6$ .................. C12M 1/34; C12M 1/40; C12Q 1/68
[52] U.S. Cl. .................. 422/68.1; 422/50; 422/69; 422/82.01; 435/4; 435/6; 435/7.1; 435/7.2; 435/501
[58] Field of Search .................. 73/763, 769, 774, 73/781, 855; 250/305, 306, 307, 309, 311; 422/50, 68.1, 69, 82.01; 435/4, 6, 7.1, 7.2, 810; 436/501, 63

[56] References Cited

U.S. PATENT DOCUMENTS

| 4,724,318 | 2/1988 | Binnig | 250/306 |
| 4,868,396 | 9/1989 | Lindsay | 250/440.1 |
| 5,144,833 | 9/1992 | Amer et al. | 73/105 |
| 5,171,992 | 12/1992 | Clabes et al. | 250/306 |
| 5,289,004 | 2/1994 | Okada et al. | 250/306 |
| 5,353,632 | 10/1994 | Nakagawa | 73/105 |
| 5,363,697 | 11/1994 | Nakagawa | 73/105 |

FOREIGN PATENT DOCUMENTS

| A-0404682 | 9/1989 | European Pat. Off. |
| A-0397416 | 11/1990 | European Pat. Off. |
| A-0410618 | 1/1991 | European Pat. Off. |
| 63-304103 | 12/1988 | Japan |
| A-2235049 | 2/1991 | United Kingdom |

OTHER PUBLICATIONS

Burnham, N. et al; "Measuring the nanomechanical properties and surface forces . . . ", J. Vac. Sci. Techn. A, vol. 7, No. 4 Jul./Aug. 1989 pp. 2906–2913.

Burnham, N. et al; "Probing the Surface Forces of Monolayer Films . . . ", Physical Review Letters, vol. 64, No. 16, Apr. 16, 1990 pp. 1931–1934.

*Primary Examiner*—Ardin H. Marschel
*Attorney, Agent, or Firm*—Morrison & Foerster LLP

[57] ABSTRACT

This invention relates to a scanning probe microscope which examines or processes directly the structure of substance surfaces at the molecular or atomic level, and a method for processing molecules using a scanning probe microscope and a method for detecting DNA base arrangement. A scanning probe microscope has a probe approaching or contacting the substance surface to detect a physical quantity between the substance surface and the probe, wherein the physical quantity is what is interacted or chemically reacted between the substance surface and the molecules or atom groups which act as a sensor and are fixed on the probe, scanning at an atomic level of precision. Therefore, surface structure within a microscopic region can be examined or processed at the molecular or atomic level. A method for detecting DNA base arrangement with any one of three or four kinds of probes fixed with any one of four different kinds of molecules interacting four kinds of bases consisting of DNA, by approaching single stranded DNA fixed on a substrate, measuring the force and scanning by an atomic force microscope at an atomic level of precision.

8 Claims, 15 Drawing Sheets

ATCGGTACGTTACTGCCT

309

311

310

ATCGGTACGTTACTGCCT

309

310

312 { TAGCCATGCATTGACGGA
ATCGGTACGTTACTGCCT

309

SCANNING PROBE MICROSCOPE AND MOLECULAR PROCESSING METHOD USING THE SCANNING PROBE MICROSCOPE

This application is a division of application Ser. No. 08/875,694, filed Apr. 29, 1992, now U.S. Pat. No. 5,363,697.

FIELD OF THE INVENTION

The present invention relates to a scanning probe microscope which examines and processes directly structural surfaces at the molecular or atomic level and a method for processing molecules using the scanning probe microscope and a method for detecting DNA base arrangement, which is useful in molecular biotechnology, medical science, criminal medicine, agriculture, forestry, fisheries and pharmaceutical companies.

BACKGROUND OF THE INVENTION

The prior art is as follows, concerning the method for examining or processing structural surfaces at the molecular or atomic level and the method for detecting DNA base arrangement:

(1) The method for examining structural surfaces at the molecular or atomic level:

For example, an X-ray microanalyser measures ratio of existing atoms, spectroscopic means analyze the kinds of chemical bonds, and a chemical reactor distinguishes the types of chemically sensitive groups. A scanning tunneling microscope (STM) directly examines structural surfaces to distinguish individual atoms by measuring tunneling current variations corresponding to the atoms in structural surfaces. This method can detect distribution of impurities in a semiconductor substrate. The information acquired by such means clarify surface structure.

(2) The method for processing structural surfaces at the molecular or atomic level:

A chemical reactor can process surface structure. A common method is to repeat operations to change the structure of partially unprotected surfaces, using a protecting group; removing it to another part to react another unprotected structure and so on. As stated in "Nature" Vol. 344 (5) page 524 (1990), for example, a scanning tunneling microscope (STM) has been used to process surface structure. An individual Xenon molecule has been successfully placed side by side on a nickel substrate with an atomic level of accuracy.

(3) The method for detecting DNA base arrangement:

Recent biotechnology studies have produced living organisms with superior useful characteristics by genetic engineering. Organisms have been engineered to produce useful substances more efficiently.

In the biotechnology field, it is important to know the base arrangement of DNA (Deoxyribonucleic acid) which controls characteristics of a gene.

Certain methods for detecting DNA base arrangement are known.

FIG. 16 to FIG. 18 show a recent conventional method for detecting DNA base arrangement. FIG. 16 is a conceptual drawing which shows a single stranded DNA template used to produce double stranded DNA using DNA polymerase and four kinds of nucleotides. As is shown in FIG. 16(a), the DNA is treated in alkali and changed to single stranded DNA 309. Then, as is shown in FIG. 16(b), primer 310 including radioactive $^{32}$P is added to the single stranded DNA 309. This solution in which four kinds of Deoxyribonucleotide triphosphoric acid 311 (common name of this molecule is nucleotide; they are (A) including adenine as a base, (T) including thymine, (C) including cytosine and (G) including guanine) and DNA polymerase are mixed to produce a complementary base pair (to hydrogenate as base pairs thymine with adenine, and guanine with cytosine uniquely) on single stranded DNA 309, making double stranded DNA 312, as in FIG. 16(c).

A small quantity of deoxyribonucleotide triphosphoric acid is permuted by hydrogen from the hydroxyl group of the 3'-site of the deoxyribose nucleotide.

Such a modified nucleotide which is taken in by DNA can not be added to the next nucleotide and the reaction stops here. Consequently, as shown in FIG. 17, after a certain period of reaction, a small quantity of a modified nucleotide 313, adenine, is taken into a strand in a random like manner, similar to a monomer in a random polymer, which produces various types of double stranded DNA, with adenine at one end, resulting in double stranded DNA having different lengths.

FIG. 17 is a drawing which models the method for making various types of double stranded DNA having adenine at one end and varying in length. 314,315,316 and 317 in FIG. 17 show nucleotides hydrogenated with a complimentary base of single stranded DNA 309.

FIG. 17(a) shows each component before reaction. FIG. 17(b) shows variable length DNA having adenine at one end, obtained by reaction. FIG. 17(c) shows three different lengths of double stranded DNA having adenine at one end.

In the same way, repeated operations for the other three kinds of nucleic acid bases can produce various types of double stranded DNA having adenine cytosine, thymine or guanine at one end.

Four kinds of DNA solution 318, 319, 320 and 321 as shown in FIG. 18 are electrophoresed in four lanes, and the pattern 322 as in FIG. 18 is measured by autoradiography, so the original DNA base arrangement can be detected. An arrow 323 in FIG. 18 shows the direction of the electric field during electrophoresis. However, the problems of the prior art for examining or processing surface structure or detecting DNA base arrangement are as follows:

(1) On examining surface structure at the molecular or atomic level:

An X-ray microanalyser and a spectroscopic or chemical analyser are useful. However, a spectroscopic analyser can not examine surface structure smaller than the wavelength of light and the operation is complicated. STM surface structure analysis is possible only when there are few atoms and impossible when the surface substance has many kinds of atoms in composition. That is, if there are many kinds of atoms, it is difficult to distinguish between atoms, because an electron belonging to an atom is influenced by an electron cloud of a neighboring atom.

(2) On processing surface structure at the molecular or atomic level:

A chemical reaction processing method has a problem that although only a part of the surface structure should be changed, all reaction sites are reacted. Therefore, a protecting group is needed to cover the reaction sites. This method is impossible without a protecting group. Moreover, it is difficult to process only a microscopic region. For processing surface structure of many kinds of atoms by STM at the molecular or atomic level, an STM probe must carry the atoms. However, as the kinds of atoms to be carried are limited, it is difficult to process surface structure by STM.

(3) On detecting DNA base arrangement:

Problems of known methods are: (a) A lot of DNA is needed. (b) Radioactive $^{32}P$ to be used needs a special facility to protect from radiation sickness. (c) The shelf life of $^{32}P$ is as short as 14 days so that reagents have to be continuously replaced.

SUMMARY OF THE INVENTION

It is an object of the present invention to provide a scanning probe microscope which can examine and process directly structural surfaces at the molecular or atomic level and a method for processing molecules using the scanning probe microscope and a method for detecting DNA base arrangement, easily safely and quickly, using only a small quantity of DNA, in order to solve the above-mentioned problems of the prior art.

According to a first aspect of the invention I provide a scanning probe microscope comprising a probe approaching or contacting a substance surface to detect a physical quantity between the substance surface and the probe wherein the physical quantity is what is interacted or chemically reacted between the substance surface and molecules or atom groups which act as a sensor and are fixed on the probe, and which scans at atomic level of precision.

It is preferable in this invention that the scanning probe microscope is an atomic force microscope and the physical quantity to be detected is an atomic force.

It is preferable in this invention that the scanning probe microscope is a scanning electrochemical microscope and the physical quantity to be detected is an electric current.

It is preferable in this invention that the molecules which act as a sensor are fixed on the probe to form a chemically adsorbed monomolecular film.

According to a second aspect of the invention I provide a scanning probe microscope comprising a probe approaching or contacting a substance surface to detect a physical quantity between the substance surface and the probe wherein the probe is separated and transferred to approach or contact the substance surface repeatedly, and wherein the physical quantity is what is interacted or chemically reacted between the substance surface and molecules or atom groups which act as a sensor and are fixed on the probe.

It is preferable in this invention that the scanning probe microscope is an atomic force microscope and the physical quantity to be detected is an atomic force.

It is preferable in this invention that the molecules which act as a sensor are fixed on the probe to form a chemically adsorbed monomolecular film.

According to a third aspect of the invention I provide a method for processing molecules of a substance surface at the molecular or atomic level comprising strongly interacting or chemically reacting molecules or atom groups of the substance surface with molecules or atom groups fixed to the scanning probe and detecting a physical quantity which is measured through the probe by approaching or contacting the substance surface.

It is preferable in this invention that the processing method processes the molecules with an atomic force microscope and the physical quantity being interacted between molecules or atom groups which are fixed on the probe and the substance surface is an atomic force.

It is preferable in this invention that the processing method processes with a scanning electrochemical microscope and the physical quantity to be detected is an electric current.

According to a fourth aspect of the invention I provide a method for detecting DNA base arrangement with any one of three or four kinds of probes fixed with any one of four different kinds of molecules interacting with four kinds of nucleic acid bases comprising, moving the probe to approach a single stranded DNA fixed on a substrate, measuring the force between the probe and the nucleic acid strand by scanning with an atomic force microscope at an atomic level of precision, and detecting a physical quantity between the nucleic acid strand and the probe.

It is preferable in this invention that the four different kinds of interacting molecules are molecules including bases of DNA.

it is preferable in this invention that the four different kinds of interacting molecules are molecules including bases of RNA.

The scanning probe microscope of the present invention can examine and process directly the structure of a substance surface within a microscopic region at a molecular level or atom group level. It is possible to examine or process directly the structure of a substance surface having a variety of atoms, because molecules or atom groups which are fixed on a probe can interact or chemically react with molecules or atom groups of the substance surface strongly.

As the scanning probe microscope is an atomic force microscope (AFM) and the physical quantity to be detected is an atomic force, it is possible to examine or process directly the structure of a substance surface easily, even though a sample is non-conductive.

According to the invention, as the scanning probe microscope is a scanning electrochemical microscope (SEM) and the physical quantity to be detected is an electric current, it is possible to examine or process directly the structure of a substance surface easily, even though electrochemical variation without any force interaction occurs.

According to the invention, the method for processing molecules of a substance surface in the present invention can process surface structure within a microscopic region, by easy operation without the necessity of protective groups used in the prior art.

It is possible to process directly the structure of a substance surface having a variety of atoms, because molecules or atom groups which are fixed on a probe can interact or chemically react with molecules or atom groups of the substance surface strongly.

As the scanning probe microscope is an atomic force microscope (AFM) and the physical quantity interacted between molecules or atom groups which are fixed on a probe and molecules or atom groups of the substance surface is an atomic force, it is possible to process directly the surface structure easily, even though a sample is non-conductive.

Further, as the scanning probe microscope is a scanning electrochemical microscope (SEM) and the physical quantity interacted between molecules or atom groups which are fixed on a probe and molecules or atom groups of the substance surface is an electric current, it is possible to process directly the surface structure easily, even though electrochemical variation without any force interaction occurs.

The method for detecting DNA base arrangement in the present invention can detect DNA base arrangement easily, safely and quickly, even with much a smaller quantity of DNA than that used in conventional methods, —only a piece of DNA is enough for measuring, as a radioactive agent is not used.

Furthermore, DNA base arrangement can be decided more easily and quickly than using the conventional methods, as it uses three or four kinds of micro probes.

In this invention, it is easy to determine DNA base arrangement, because fixing a sample to a substrate and fixing molecules to a probe can be easily operated using molecules which have predictable physical interactions.

In this invention, it is easy to determine RNA base arrangement, because fixing a sample to a substrate and fixing a molecule to a probe can be easily operated using molecules which have predictable physical interactions.

BRIEF DESCRIPTION OF THE DRAWINGS

FIG. 16(a) shows treating DNA in alkali to produce single stranded DNA; FIG. 16(b) shows mixing a radioactive primer and DNA bases with the single stranded DNA of FIG. 16(a); and FIG. 16(c) shows producing double stranded DNA.

FIG. 17(a) shows the components before reaction; FIG. 17(b) shows variable lengths of single stranded DNA with adenine at one end; and FIG. 17(c) shows different lengths of double stranded DNA having adenine at one end.

DETAILED DESCRIPTION OF THE INVENTION

This invention relates to a scanning probe microscope which examines or processes directly surface structure of a substance at molecular or atomic level, and a method for processing molecules using a scanning probe microscope and a method for detecting DNA base arrangement. A scanning probe microscope with the probe approaching or contacting the substance surface to detect physical quantity between substance surface and a probe, characterized in that the physical quantity is what is interacted or chemically reacted between the substance surface and the molecules or atom groups as a sensor fixed on the probe, scanning at the atomic level of precision. Therefore, structure of substance surface within microscopic region can be examined or processed at molecular or atom level. A method for detecting DNA base arrangement with any one of three or four kinds of probes fixed with any one of four different kinds of molecules interacting four kinds of bases consisting of DNA, by approaching single chain DNA fixed on a substrate, measuring the force and scanning by an atomic force microscope at atom level of precision.

According to the invention, a microsensor or microprocessor for distinguishing directly a molecule or an atom group comprising a substance surface or changing the structure, by fixing a molecule or an atom group on a probe of a scanning probe microscope, can solve the problems of the prior arts.

A scanning probe microscope is an apparatus for scanning substance surfaces at an atomic level of precision, with a micro probe approaching or contacting a substance surface to examine the shape of the substance surface by detecting a physical quantity, such as tunneling current, force or heat etc., which occurs by various interactions between the probe and the substance surface.

For example, there is an atomic force microscope (AFM), a scanning electrochemical microscope (SEM), and a scanning tunneling microscope (STM), which can be used as in a scanning probe microscope. They are defined as Type 1 scanning probe microscopes.

Another type of scanning probe microscope is an apparatus for examining the shape of a substance surface by repeated operations after detecting a physical quantity, such as tunneling current, force or heat etc., which occurs by various interactions between the probe and the substance surface, the probe is detached from the substance surface and removed at an atomic level of precision, to approach or contact the substance surface again, for detecting the physical quantity which occurs between the probe and the substance surface. It is defined as Type 2 scanning probe microscope.

A scanning probe microscope in the present invention is characterised in using a probe fixed with a molecular or atomic group which interacts or chemically reacts with specific molecules or atom groups on the sample surface.

Figure 1:
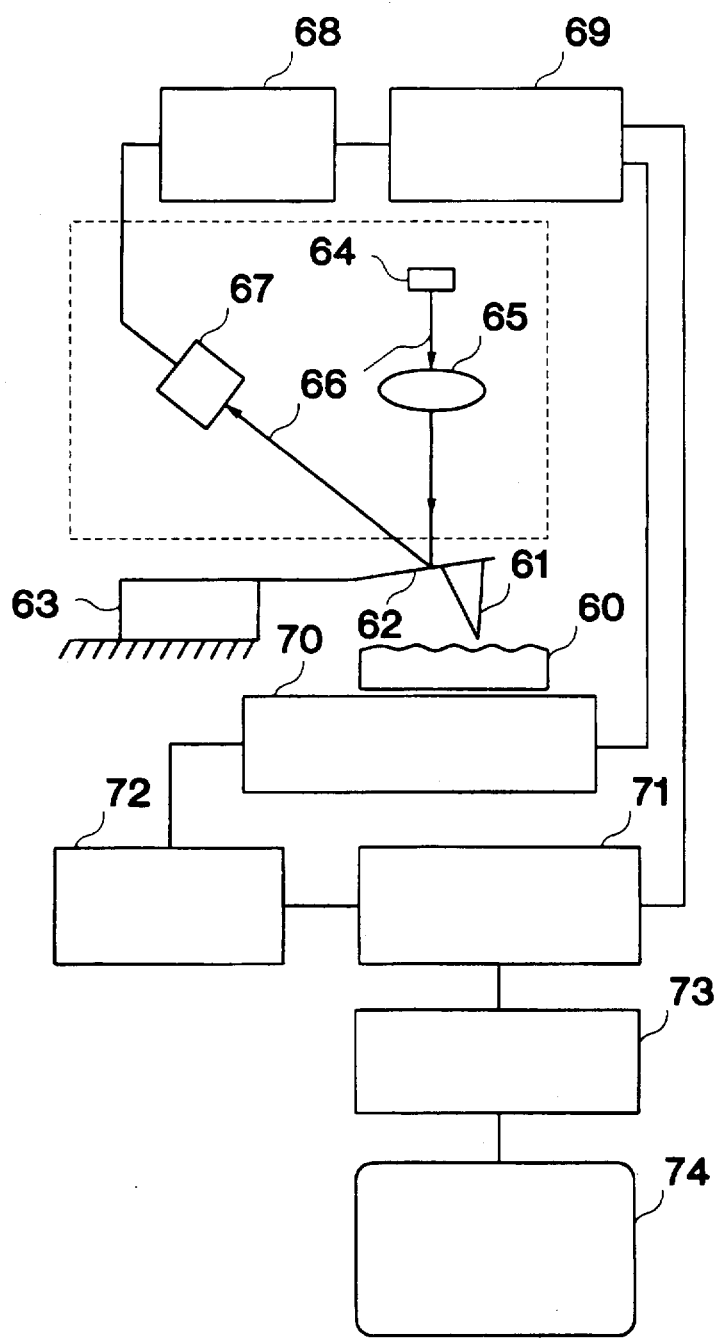
FIG. 1 shows the main components of an atomic force microscope (AFM); an example of a scanning probe microscope: and an embodiment of the present invention.

The principle mechanism is as follows: FIG. 1 shows the main components of an atomic force microscope (AFM) as an example of a Type 1 scanning probe microscope in the present invention. In FIG. 1, 60 is the sample to be measured. 61 is a probe. 62 is a cantilever for the probe, of which the upper surface is covered with metal by a vapor deposition process so as to reflect a light such as a laser. 63 is a probe base fixed on a microscope body. 64 is a light source such as a laser etc. 65 is a lens which converges the light from the light source and projects it to the upper side of cantilever 62. 66 is a light. 67 is a photodiode: a sensor which catches light variations and converts it to an electric signal (a voltage). 68 is an amplifier for amplyfing electric signals from sensor 67. 70 is a piezoelectric scanner for scanning a sample 60 at an atomic level of precision, which expands and contracts with an electric signal (a voltage) and can move in three directions. That is, in the Z axis direction for taking a sample up and down, in the Y axis direction for moving a sample this side and back, and in the X axis direction for transfering a sample right and left. 69 is a control servo circuit which controls Z axis direction of the sample. 71 is a memory device to X,Y,Z axes directions which memorizes test results of the sample. 72 is a scanning circuit to X,Y axes directions which controls a signal to scan a sample within an established scope. 73 is a data analyser. 74 is a display. A probe 61 scans by approaching or contacting the sample surface, within the scope and pitch which scanning circuit 72 is preselected in the X,Y directions.

Molecular or atomic groups fixed on the probe interact or chemically react with specific molecules or atoms on the sample surface strongly, where an atomic force occurs, for example. When probe 61 moves in the Z direction, sensor 67 catches it the directional change of light 66 and converts it to an electric signal, so that a piezoelectric scanner 70 is moved in the Z direction, through an amplifier 68 and a control servo circuit for Z direction 69.

In this case, a control servo circuit 69 outputs control signals, so as to make the outputs of the electric signal from sensor 67 continuously steady.

Namely, when a strong atomic force generates the force to decrease the distance between probe 61 and sample 60, control servo circuit 69 works to separate sample 60 in the Z direction, as if such force had not been generated. Thus, when probe 61 scans a sample within a predesignated scope, the test result is output by memory device 71 for the X,Y,Z directions, to data analyser 73, display 74 or a recorder (not shown in FIG. 1).

Figure 2:
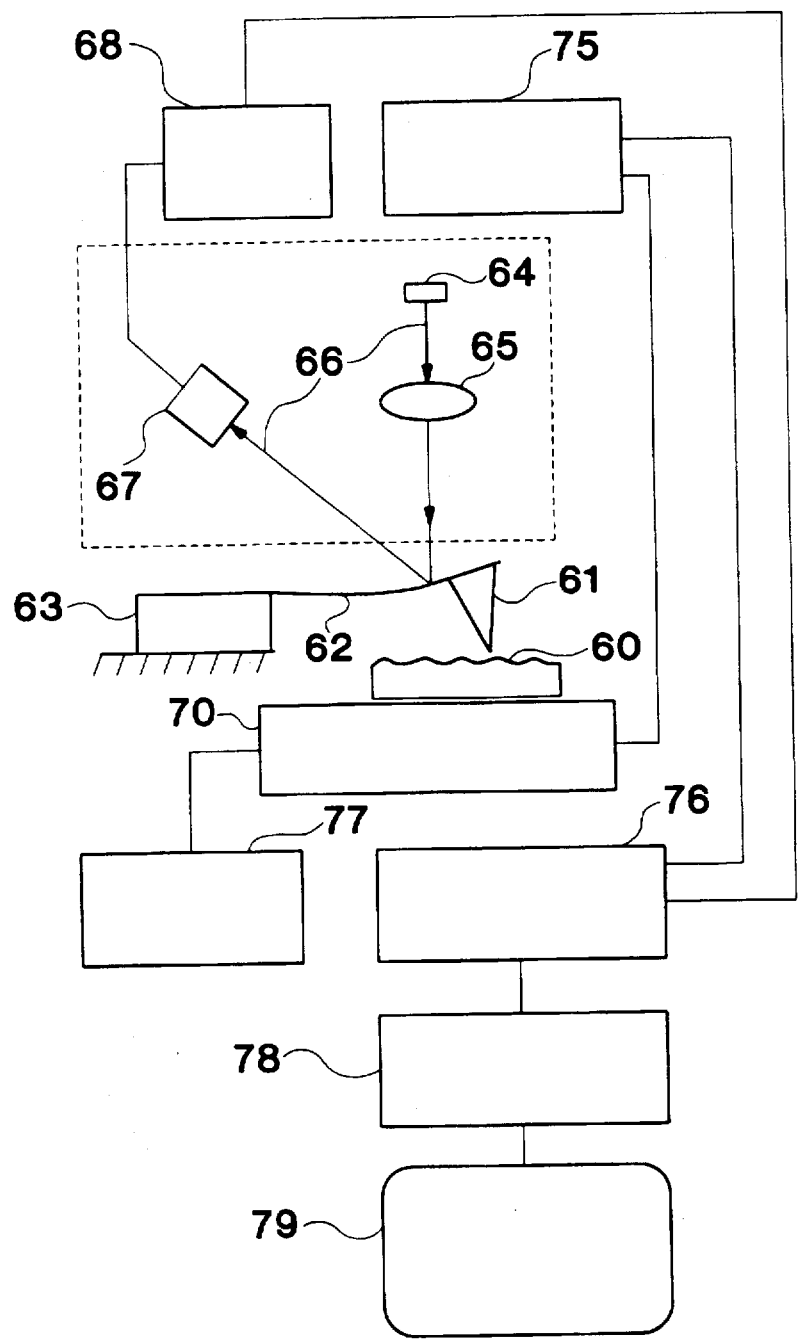
FIG. 2 shows the main components of an atomic force microscope (AFM); an example of a scanning probe microscope; and an embodiment of the present invention.

FIG. 2 shows the main part components of a atomic force microscope (AFM) which is an example of a Type 2 scanning probe microscope of the present invention. Some common parts between FIG. 2 and FIG. 1 omit explanation. 75 is a control circuit which controls a sample in the Z direction. 76 is a memory device for memory of the X,Y,Z directions and for electronic signals from amplifier 68. 77 is a scanning circuit for the X,Y directions which controls the signals of scanning a sample within the designated scope. 78 is a data analyser. 79 is a display. A scanning circuit for the X,Y directions 77 preselects scanning scope and pitch, and a control circuit for the Z direction 75 makes a probe 61 approach or contact surface of a sample 60.

Molecule or atomic groups fixed on the probe interact or chemically react with specific molecules or atoms on the sample surface strongly, where an atomic force occurs, for example. When a probe 61 moves in the Z direction, sensor 67 catches it recognizing the directional change of light 66 and converts it to an electric signal. Amplifier 68 amplifies it, and memory device 76 memorized the electric signals and the positions at X and Y. Then, the control circuit for the Z direction 75 makes probe 61 move apart from the sample surface. The scanning circuit for the X–Y directions 77 moves it only to the predesignated pitch. Again the control circuit for the Z direction 75 makes a probe 61 approach or contact the surface of sample 60. In the same way, molecular or atomic groups fixed on the probe interact or chemically react with specific molecules or atoms on the sample surface strongly, where an atomic force occurs, for example. When a probe 61 moves in the Z direction, sensor 67 catches it recognizing the directional change of light 66 and converts it to an electric signal. Amplifier 68 amplifies it, and a memory device 76 memorizes the electric signals and the positions at X and Y. Such operations are repeated such that the scanning circuit for the X–Y directions 77 is predesignated. Thus, when a probe 61 scans a sample within a predesignated scope, the test result is output by data analyser 78, display 79 or a recorder (not shown in FIG. 2) The dimensions of probe 61 are, for example: base diameter of about 4 μm, length about 1 μm, curvature—radius of the tip about 0.5 to 1 μm, and thickness of cantilever 62 about 1.5 μm. These dimensions, however, are not specifically limited.

Figure 3:
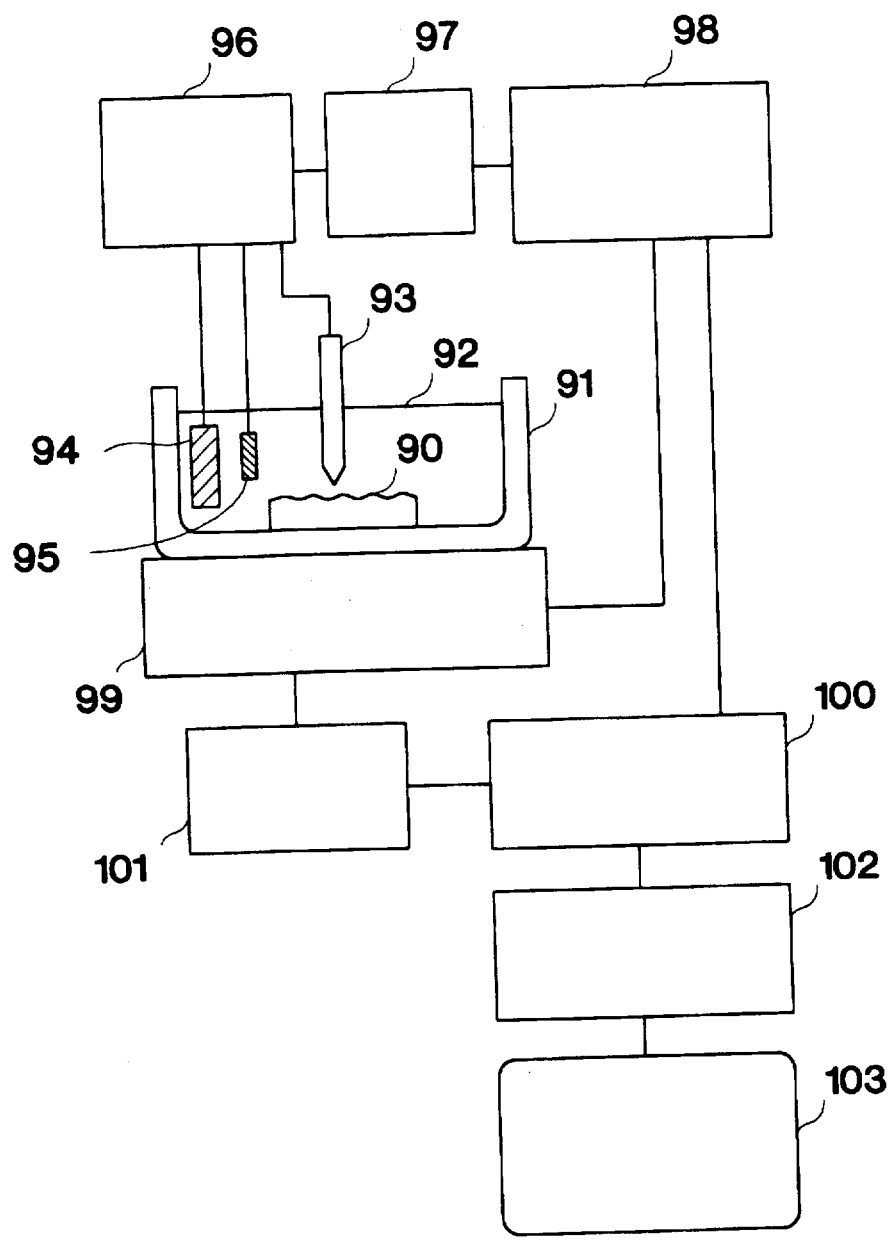
FIG. 3 shows the main components of a scanning electrochemical microscope (SEM); an example of a scanning probe microscope; and an embodiment of the present invention.

FIG. 3 shows the main components of a scanning electrochemical microscope (SEN) as an example of a scanning probe microscope of the present invention. In FIG. 3, 90 is a sample to be measured. 91 is a cell. 92 is a solution of an electrolytic liquid. 93 is a working electrode probe. 94 is a counter electrode composed of platinum etc. 95 is a reference electrode for determining the electrical potential of probe 93. 96 is potentiostat. 97 is an amplifier to amplify electric current from potentiostat 96. 99 is a piezoelectric scanner for scanning sample 90 at an atmic level of precision, which expands and contracts with an electric signal (a voltage) and can move in three dimentional directions. That is, in the Z axis direction for taking a sample up and down, in the Y axis direction for moving a sample this side and back, and in the X axis direction for transfering a sample right and left. 98 is a control servo circuit which controls Z axis direction of the sample. 100 is a memory device for the X,Y,Z axes directions which memorizes test results of the sample. 101 is a scanning circuit for the X,Y axes directions which controls a signal to scan the sample within an established scope. 102 is a data analyser. 103 is a display.

If a strong electric current will go through probe 93, at a place where a strong interaction, for example, a electrochemical reaction occurs between molecules or atom groups fixed on probe 93 and the molecules or atom groups on the surface of sample 90, piezoelectric scanner 99 moves in the Z axis direction in order to make electric current move down to the first settled value. The other operations are the same as the operating mechanism of the AFM shown in FIG. 1.

The piezoelectric scanner moves a sample in the directions as in the examples refering to FIG. 1, FIG. 2 and FIG. 3. Of course a probe can move in conjunction with the piezoelectric scanner insted of a substrate.

Figure 4:
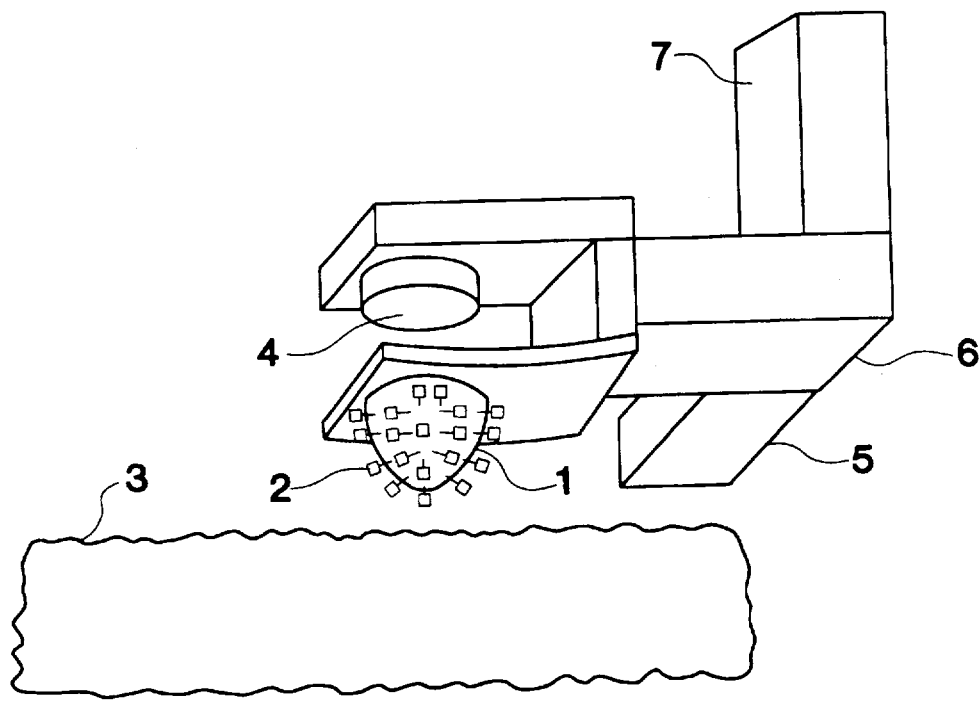
FIG. 4 is a partial model of an atomic force microscope (AFM) which shows that molecules or atom groups are fixed on a probe of the AFM; and shows an embodiment of the present invention.

FIG. 4 is a partial model of an atomic force microscope (AFM) which shows the that molecules or atomic groups are fixed on a probe of the AFM in accordance with an embodiment of the present invention.

Figure 5A:
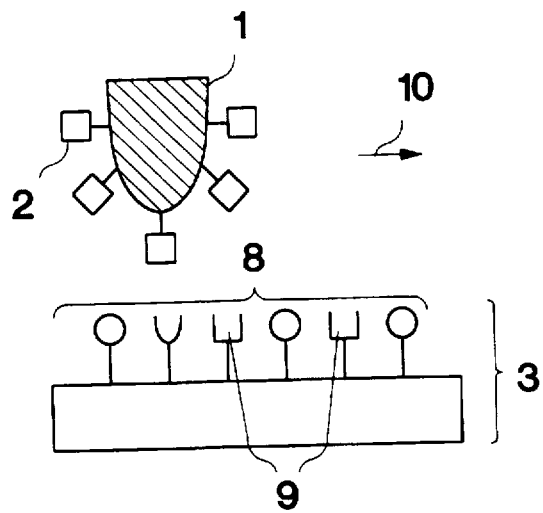
FIGS. 5(a) and (b) are a model which shows examining surface structure by AFM; and shows an embodiment of the present invention.
Figure 5B:
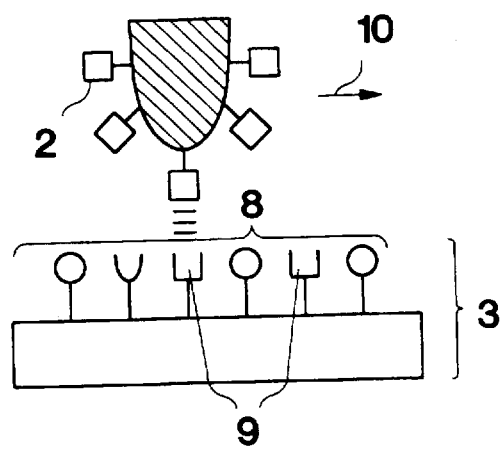

FIG. 5 shows examining the surface structure of a substance by AFM in accordance with an embodiment of the present invention.

As is shown in FIG. 4, molecules or atom groups 2 which are used as a sensor are fixed on a probe 1 of AFM. A sensor 4 which detects the force between probe 1 and the surface of a sample substance 3 controls the relative position between the sample substance 3 and the probe 1 at an atmic level of precision, through piezoelectric scanners 5,6 and 7 Piezoelectric scanners 5 and 6 make probe 1 scan in the X–Y directions and piezoelectric scanner 7 changes the distance between probe 1 and the surface of sample substance 3. Molecules or atom groups 2 will interact or react chemically with molecules or atom groups 9 comprising the sample substance 3 strongly.

Next, as is shown in FIG. 4 and FIG. 5, a piezoelectric scanner 7 makes probe 1 approach or contact the sample substance 3. Piezoelectric scanners 5 and 6 make probe 1 scan at an atomic level of precision. Sample substance 3 is composed of molecules or atom groups 8, in which exist molecules or atom groups 9 which interact or react chemically with molecules or atom groups 2 on probe 1 strongly. Piezoelectric scanners 5 and 6 move probe 1 in direction 10. When probe 1 comes to the position of the molecules or atom groups 9, strong interaction or chemical reaction occurs and generates a bigger force. A sensor 4 can detect the force through molecules or atom groups 2 of probe 1 and distinguish the position of the molecules or atom groups 9 on the surface of sample substance 3. Sensor 4 can adopt any suitable mechanism to detect the force as shown in FIG. 1. The structure of sample substance 3 can be examined directly at a molecular or atomic level, by repeated operations changing the kinds of molecules or atom groups 2 which are fixed on the head of the probe 1. If the molecules or atom groups 2 on probe 1 of the AFM can interact or react chemically with molecules or atom groups 9 comprising sample substance 3 strongly, the structure of sample substance 3 can be processed at the molecular or atomic level.

In this case, the process is done as follows:

First, for example, examine the shape of the structure of sample substance 3 by conventional AFM with a probe fixing nothing. Next, based on the above information, bring the probe 1 of AFM having molecules or atom groups 2 above the sample substance 3 to be processed. Then, bring the probe 1 near the sample substance 3, scan it by piezoelectric scanner 5 or 6 at an atomic level of precision, measuring the force by a sensor 4 through molecules or atom groups 2 on the probe 1, and approach or contact a specific surface structure to be processed, to make the probe 1 generate a strong interaction or chemical reaction to change The structure of the surface.

Another process is that at first, make the probe 1 contact sample substance 3, scanning at an atomic level of precision, measuring the force and generating strong interaction or chemical reaction to change the structure of the surface.

The structure of a sample substance 3 can be examine directly at the molecular or atomic level, by repeater operations changing kinds of molecules or atom groups 2 fixed on the head of probe 1.

A physical quantity which is generated by an interaction or chemical reaction on the sample substance is, for example, van der Waals force, electric Coulom'b force generated by ion, atomic force like Coulom'b force by hydrogen bond, electric current generated by electrochemical reaction, or any others which are measurable.

Figure 6:
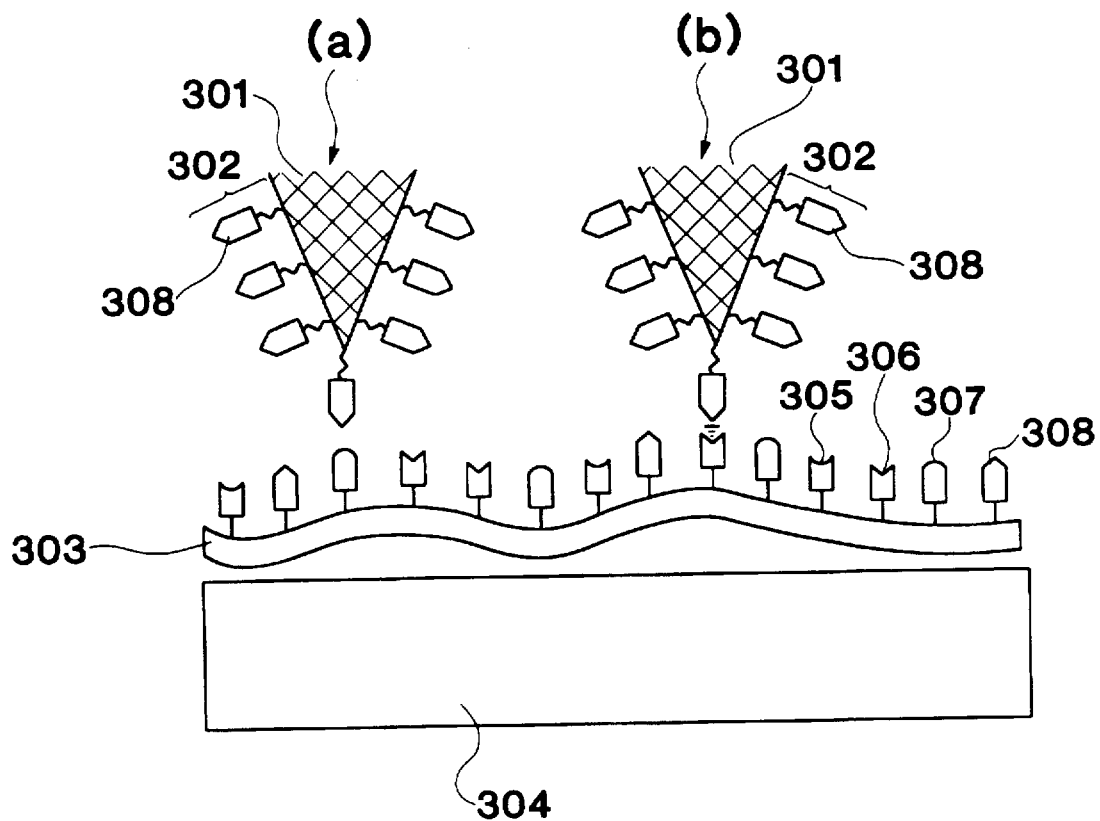
FIG. 6 is a model which shows detecting the base arrangement of single stranded DNA; and shows an embodiment of the present invention.

The principle of a method for detecting DNA base arrangement using a scanning probe microscope in the present invention is as follows:

As is shown in FIG. 6, a probe 301 of AFM with molecule 302 including adenine 308 or any of the four kinds of DNA bases approach a single standed DNA 303 fixed on substrate 304 and scan it at an atomic level of precision, measuring the force generated by interaction. When the adenine 308 portion of molecule 302 fixed on probe 301 approaches thymine 306, a stronger force occurs than in the case of the other bases, adenine 308, guanine 307, or cytosine 305 due to hydrogen bond formation.

By examining where the force occurs, the position of thymine 306 on DNA 303 can be distinguished. In FIG. 6(a), when adenine 308 fixed on probe 301 approaches guanine 307 of DNA 303, no strong force occurs on probe 301. In FIG. 6(b), when adenine 308 fixed on probe 301 approaches thymine 306 of DNA 303, a strong force occurs on probe 301. Repeated operations by the probe with molecules including thymine, cytosine or guanine can give the information on the position of adenine, guanine or cytosine of single stranded DNA 303.

Base arrangement of single stranded DNA can be detected by the above procedure. As bonding is unique between adenine and thymine or guanine and cytosine, knowing the base arrangement of single stranded DNA is knowing the base arrangement of doublr stranded DNA. As DNA includes four kinds of bases, adenine, thymine, guanine and cytosine, if the position of three kinds of bases can be detected, DNA base arrangement can be determined in principle.

For the detection, though four kinds of probes are used in the above examples, any three kinds of the four are enough using adenine, thymine, guanine or cytosine. Not only adenine, thymine, guanine or cytosine, but also anything which can interact with a base consisting of DNA is useful for a probe. The interaction is not necessarily an atomic force like a hydrogen bond, ion force etc. Molecules including bases consisting of RNA or the induced substances etc. can be used, for example. In the case of RNA, four kinds of bases consisting of RNA are uracil, adenine, guanine and cytosine.

Uracil specifically bonds adenine of single stranded RNA. The other bases bond in the same way as DNA.

A method for fixing molecules or atom groups on a probe, a method for making a sample to be measured and a method for making a probe and a sample for detecting DNA base arrangement are as follows:

The method shown in paragraphs from 1-2-6 to 1-2-9 are applications proposed by N. Balachander, C. N. Subenik, Langmuir, Vol.6 (11) page 132 (1990).

1: A method for fixing molecules or atom groups on a probe of AFM:

1-1: Preliminary treatment of a probe of AFM: A probe of AFM is made from silicone nitride or silicone oxide.

In case of silicone nitride, a probe is oxidized, adding hydroxyl groups on the surface by means of alkali treatment by natrium hydroxide, treatment by heated nitric acid, treatment by heated sulfuric acid, or heat treatment in an oxygen atmosphere.

1-2: A method for fixing molecules or atom groups:

1-2-1. A method for fixing molecules or atom groups with methyl group at one end 1 wt. % of a silane coupling agent

[$CH_3(CH_2)_nSiCl_3$]

(where n represents 0 to 25, preferably a range of 10 to 20) was dissolved into an organic solvent (80 vol. % hexadecane, 12 vol. % chloroform, 8 vol. % carbon tetra chloride) to form a reacting solution. The probe was dipped and held in the reacting solution for about two hours. This step was carried out in a nitrogen atmosphere at room temperature. Since the surface of the substrate contained hydroxyl groups, a dehydrochlorination reaction between the chlorosilyl groups of the silane coupling active material and the hydroxyl groups formed covalent bonds on the surface. This reaction is represented in the following formula [1].

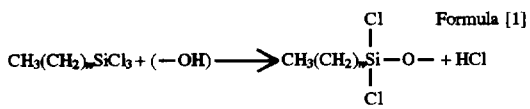

Formula [1]

The substrate was then washed with a chloroform solution for 15 minutes to remove the unreacted material remaining on the surface, followed by washing with water for 15 minutes. The —SiCl groups were changed to —SiOH groups as in formula [2].

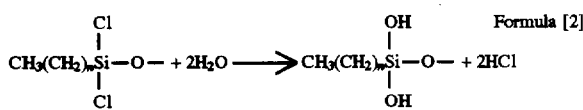

Formula [2]

Each silanol group (—SiOH) was then dehydrated and crosslinked to form a siloxane bond (—SiO—) after drying as in formula [3]. Drying temperature may be room temperature or above.

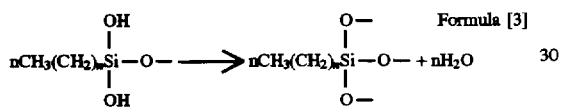

Formula [3]

Figure 7:
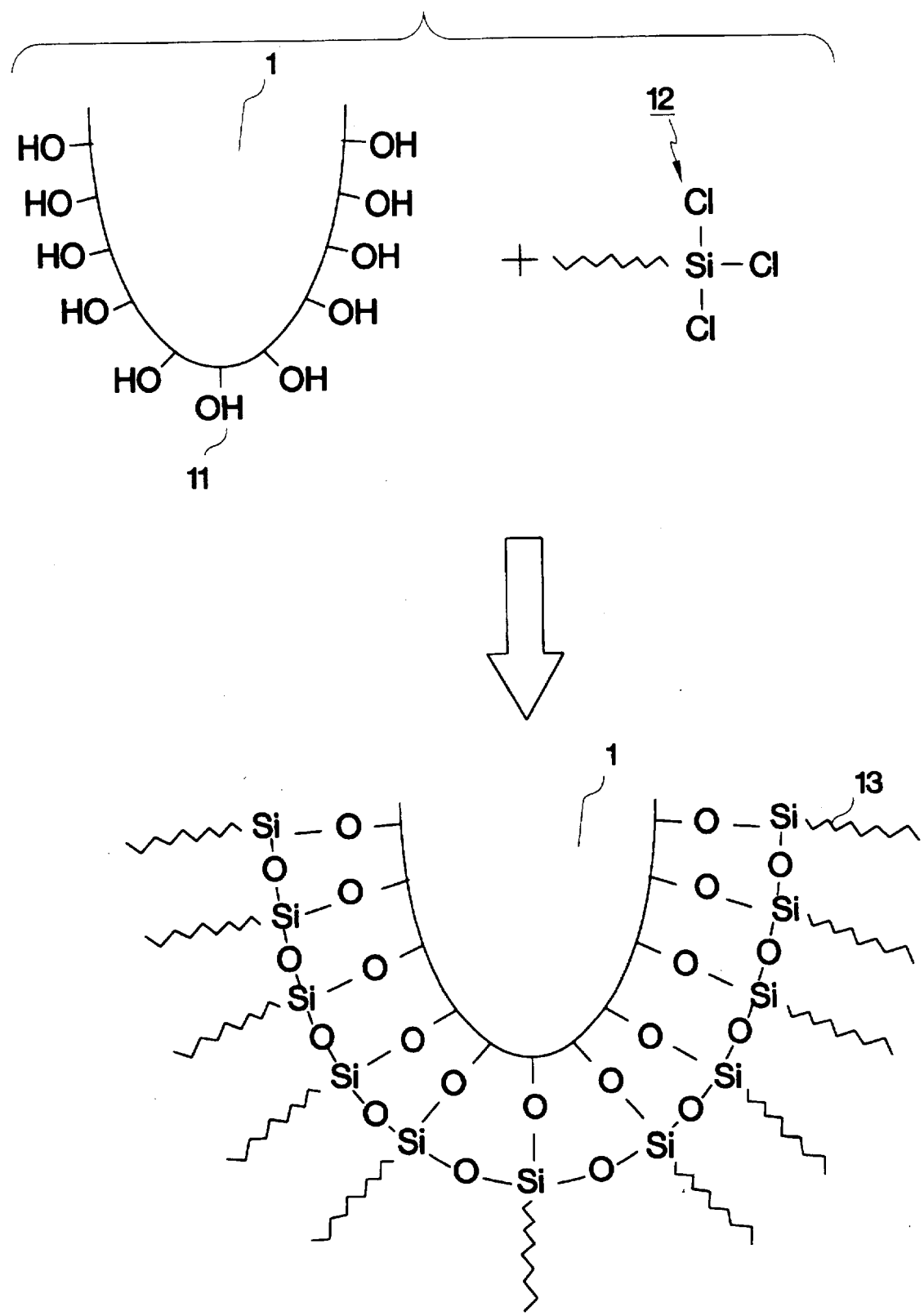
FIG. 7 is a model which shows molecules with methyl group at one end that are fixed to a probe by a silane coupling agent; and shows an embodiment of the present invention.

FIG. 7 is a model which shows that the molecule with the methyl group at one end is fixed on the probe 1 by the above-mentioned operation. As shown in FIG. 7, by reaction between the hydroxyl group 11 on the surface of probe 1 and the trichlorosilane coupling agent 12, a silane coupling agent having a methyl group at one end 13 is fixed on the probe 1.

1-2-2. A method for fixing molecules or atom groups with cyano groups at one end: 1 wt. % of a silane coupling agent

[NC(CH$_2$)$_n$SiCl$_3$]

(where n represents 0 to 2 preferably in a range of 10 to 20) is dissolved into an organic solvent (80 vol. % hexadecane, 12 vol. % chloroform, 8 vol. % carbon tetra chloride) to form a reacting solution. The a probe was dipped and held in into the reacting solution in nitrogen atomosphere the for about two hours and was washed with chloroform and water same as in 1-2-1.

1-2-3. A method for fixing molecules or atom groups with halogen groups at one end: 1 wt. % of a silane coupling agent

[X$_k$CH$_{3-k}$(CH$_2$)$_n$SiCl$_3$]

(where n represents 0 to 25, preferably in a range of 10 to 20, k represents 1, 2 or 3, X represents Cl, Br or F) was dissolved into an organic solvent (80 vol. % hexadecane, 12 vol. % chloroform, 8 vol. % carbon tetra chloride) to form reacting solution. The probe was dipped and held in the reacting solution a nitrogen in atomosphere for about two hours and was washed with chloroform and water same as 1-2-1.

1-2-4 A method for fixing molecules with alcohol groups (—CH$_2$OH) or carboxyl groups (—COOH) at one end: A silane coupling agent esterified by toluenecarboxilic acid

[CH$_3$—C$_6$H$_4$—OOC—(CH$_2$)$_n$SiCl$_3$]

(where n represents 0 to 25, preferably in a range of 10 to 20) at one end was fixed to a probe treated in the same way as stated in 1-2-1.

Then, the above probe was reacted in an ether solution including 5 wt. % of lithiumaluminumehydride (LiAlH$_4$) at room temperature for 20 minutes, or in 36 wt. % hydrochloric acid solution at 65° C. for 30 minutes and molecules with alcohol groups or carboxyl groups at one end are fixed on the probe.

1-2-5. A method for fixing molecules with alcohol groups (—CH$_2$OH) at one end:
A trichlorosilane coupling agent

[CH$_2$=CH—(Ch$_2$)$_n$SiCl$_3$]

(where n represents 0 to 25, preferably in a range of 10 to 20) with a vinyl group at one end was fixed on a probe treated in the same way as in 1-2-1. Next, this probe was dipped in 1M tetrahydrofuran solution containing diborane and reacted in an argon atomosphere at room temperature for one minute. Then, the probe was dipped in a solution mixed with 30 wt. % hydrogen peroxide and 0.1M sodium hydroxide, reacting for one minute. Molecules with alcohol groups at one end were fixed on the probe.

1-2-6. A method for fixing molecules with thiol (—SH) groups at one end:
A trichlorosilane coupling agent

[Br(CH$_2$)$_n$SiCl$_3$]

(where n represents 0 to 25, preferably in a range of 10 to 20) containing bromine one end was fixed on a probe treated in the same way as in 1-2-1. 100 mg of thiocyanic potassium were dissolved in 10 ml N,N-dimethylformamide solution. The above probe was dipped in this solution and reacted for 20 hours. Then, the probe was dipped in 10 mg/ml ether containing lithiumaluminumehydride and reacted for four hours, and molecules with thiol groups at one end were fixed on the probe.

1-2-7. A method for fixing molecules with amino (—NH$_2$) group at one end:
A trichlorosilane coupling agent

[NC(CH$_2$)$_n$SiCl$_3$]

(where n represents 0 to 25, preferably in a range of 10 to 20) containing cyano groups at one end were fixed on a probe treated in the same way as in 1-2-1.

Next, the probe was placed in 10 mg/ml ether containing ithiumaluminumehydride and reacted over night. The probe was taken out and put in an empty vessel. A solution of 10 wt. % ether was added following with. 10 wt % hydrochloric acid. The probe was placed in a triethylamine solution and reacted for two hours. It was then cleaned with chloroform solution. Molecules with amino groups at one end were fixed on the probe.

1-2-8. A method for fixing molecules with amino (—NH$_2$) groups on one end:
A trichlorosilane coupling agent

[Br(CH$_2$)$_n$SiCl$_3$]

(where n represents 0 to 25, preferably in a range of 10 to 20) containing bromine at one end was fixed on a probe treated the same way as in 1-2-1. Next, the probe was dipped in 8 ml N.N dimethylformamide solution containing sodium azide and reacted over night. The probe was then dipped in 10 mg/ml ether containing lithiumaluminumhydride and reacted all night.

The probe was taken out and put in an empty vessel. 10 wt % ether followed by 10 wt. % hydrochloric acid were added. The probe was placed in a triethylamine solution and reacted for two hours. The probe was then cleaned with chloroform solution. Molecules with amino groups at one end were fixed on the probe.

1-2-9. A method for fixing molecules with a sulfonic acid ($-SO_3H$) group on one end:
A trichlorosilane coupling agent

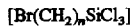

(where n represents 0 to 25, preferably in the range of 10 to 20) containing bromine at one end was fixed on a probe treated in the same way as in 1-2-1. 100 mg thiocyanic potassium was dissolved in a 10 ml N,N-dimethylformamide solution. The above probe was dipped in this solution and reacted for 20 hours. Then, the probe was dipped in 10 mg/ml ether containing lithiumaluminumhydride and reacted for four hours. Finally, the probe was dipped in a solution mixed with 30 wt. % hydrogen peroxide and 30 wt. % acetic acid at a volume ratio of 1 to 5 and reacted at 40° C. to 50° C. for 30 minutes. Molecules having a sulfonic acid end group were fixed on the probe.

1-2-10. A method for fixing an antibody of bovine serum-albumin on a probe:

The probe treated in 1-1 was dipped in a toluene solution saturated with 2,4,6-trichloro-1,3,5-triazine and treated at room temperature for two hours. After cleaning the probe with toluene, it was dipped in a 100 mg/ml solution of an antibody of bovine serum-albumin and reacted at room temperature for 30 minutes. The antibody was fixed on the probe.

1-2-11. Additional method for fixing an antibody of bovine serum-albumin on a probe:

The probe treated in 1-1 was dipped in a 10 wt. % of a 3-amino propylictriethoxylane solution at 50° C. for two hours, and then in a 2.5 wt. % glutaral dialdehyde solution at room temperature for one hour. Finally the prove was dipped in a 100 ml/mg antibody solution at room temperature for one hour and reacted. The antibody was fixed on the probe.

1-2-12. Additional method for fixing an antibody of bovine serum-albumin on a probe:

After fixing molecules with an alcohol group at one end on the probe treated as in 1-2-4 or 1-2-5, antibodies specific for bovine serum-albumin were fixed on the probe by the same way as in 1-2-10 or 1-2-11.

1-2-13. Additional method for fixing an antibody of bovine serum-albumin on a probe:

Molecules with carboxyl groups at one end were fixed on a probe treated as in 1-2-4.

The probe was dipped and held in 25 mg/ml of a 1-(3-dimethylaminopropyl)-3-ethylcarbordiimide

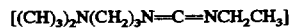

solution and reacted at 0° C. for one hour.

Finally, the probe was dipped in a 100 mg/ml antibody solution at 0° C. over night and reacted. Antibodies specific for bovine serum-albumin were fixed on the probe.

1-2-14. Another method for fixing an antibody of bovine serum-albumin on a probe:

Molecules with amino groups at one end on a probe treated as in 1-2-7 or 1-2-8. Next, the probe was dipped in a 25 mg/ml 1-(3-dimethylaminopropyl)-3-ethylcarbordiimide

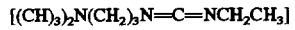

solution and reacted at 0° C. for one hour.

Finally, the probe was dipped in a 100 mg/ml antibody solution at 0° C. over night and reacted. Antibodies specific for bovine serum-albumin were fixed on the probe.

1-2-15. A method for fixing alcohol dehydrogenase: Alcohol dehydrogenase (instead of antibody) was fixed on the probe treated as in 1-2-10 to 1-2-14.

1-2-16. A method for fixing peptidase on a probe: Peptidase (instead of antibody) was fixed on the probe treated as in 1-2-10 to 1-2-14.

2.: A method for fixing molecules or atom groups on a probe of a SEM:

2-1. Pretreatment of a probe: Sharply tipped platinum wire was used as a probe of a SEM. The probe was cleaned with distilled water.

2-2. A method for fixing molecules or atom groups:

2-2-1. A method for fixing enzyme alcohol dehydrogenase 500 ml of 1M sodium hydroxide was mixed with 30 mg/ml chloroplatinic acid and 0.6 mg/ml lead acetate to make the solution pH 7.0. Then, 500 mg alcohol dehydrogenase was added to this solution.

Three electrodes were placed in the above solution: platinum wire of a SEM treated as in 2-1 as a working electrode: platinum plate as a counter electrode: and silver/chloridized-silver electrode (AG/AGCl) as a reference electrode. With a potentiostat, the electrical potential of platinum wire was set at −0.2 V for 10 seconds to the reference electrode, and platinum with alcohol dehydrogenase was electrodepositioned on the platinum wire.

Next, this platinum wire was cleaned with a phosphate buffer solution and the probe for a SEM was obtained.

3.: A method for providing samples to be measured:

3-1. A method for providing samples having two kinds of chemically sensitive groups on the surface:

A substrate was used as a sample to be measured. The substrate was either a silicone wafer covered with oxidized film, a glass substrate covered with oxidized silicone film, a graphite substrate with an oxidized surface or mica. As these substrates have hydroxyl groupsa at the surface, methyl groups ($-CH_3$), cyano groups ($-CN$) or halogen groups were adsorbed as in 1-2-1 to 1-2-3. Two kinds of chemically sensitive groups were adsorbed to the surface of each substrate.

Figure 8A:
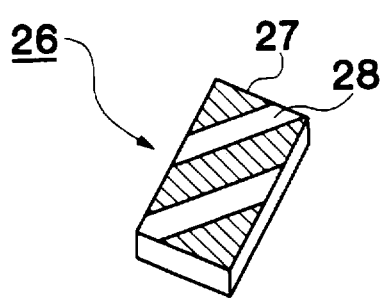
FIGS. 8(a) to (f) show a substrate fixed with two kinds of chemically sensitive groups: and shows an embodiment of the present invention.
Figure 8D:
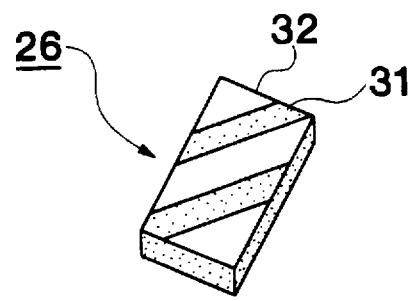
Figure 8B:
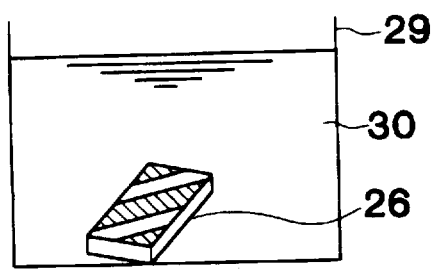
Figure 8E:
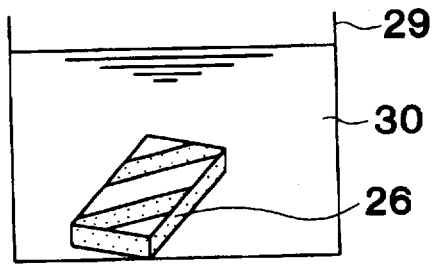
Figure 8C:
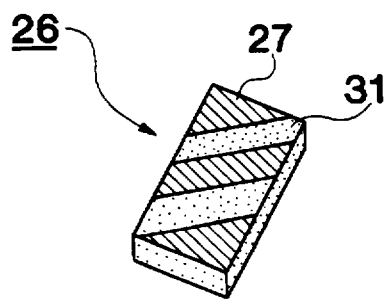
Figure 8F:
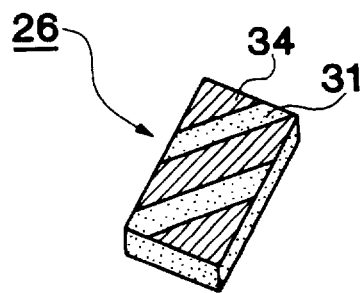

FIGS. 8(a) to (f) show the progress of producing a substrate fixed with two kinds of chemically sensitive groups. As shown in FIG. 8(a), a substrate 26 was covered with a resistive material 27 in an optional pattern beforehand. 28 shows the part with no resistive material 27. As shown in FIG. 8(b), the substrate 26 was dipped into solution 30 in a vessel 29. As shown in FIG. 8(c), chemically sensitive groups were selectively fixed on the part with no resistive material 27. 31 shows the part fixed with chemically sensitive groups. After that, as shown in FIG. 8(d), the resistive material was taken off. 32 shows the part with the resistive material off. As shown in FIG. 8(e), substrate 26 was dipped in another solution 33. As shown in FIG. 8(f), chemically sensitive groups were fixed on the part with the resistive material off. 34 shows the part fixed with chemically sensitive groups.

Thus, the substrate was fixed with two kinds of chemically sensitive groups in a predetermined pattern.

3-2. Another method for providing samples having two kinds of chemically sensitive groups on the surface:

A substrate was used as a sample to be measured. The substrate was a silicone wafer covered with an oxidized film, i.e., a glass substrate covered with an oxidized silicone film or a graphite substrate with an oxidized surface or mica. As in 1-2-5 to 1-2-9, the reaction time was adjusted, and two kinds of chemically sensitive groups adsorbed to the surface of substrate, such as a vinyl group (—CH=CH$_2$) and an alcohol group (—CH$_2$OH); a bromo group (—Br) and a thio cyano group (—SCN); a thio cyano group (—SCN) and a thiol group (—SH); a thiol group (—SH) and a sulfonic acid group (—SO$_3$H ); a bromo group (—Br) and an azide group (—NH$_3$); an azide group (—N$_3$) and an amino group (—NH$_2$); a cyano group (—SCN) and an amino group (—NH$_2$), etc.

3-3. A method for fixing substrate with three kinds of serum-albumin:

As protein, bovine serum-albumin, horse serum-albumin or bird serum-albumin were fixed on a substrate by Langmuir-Blodgett's technique.

Figure 9A:
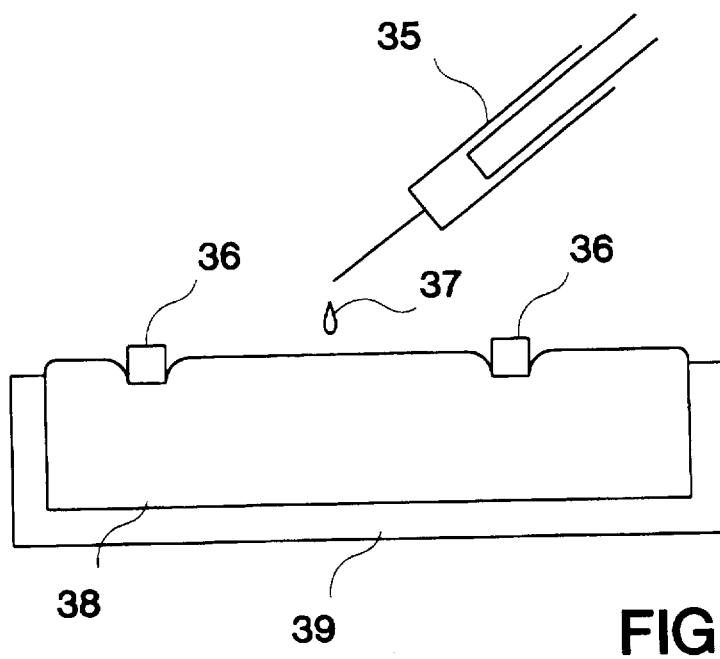
FIGS. 9(a) to (c) show fixing a protein on a substrate by Langmuir-Blodgett's technique; and shows an embodiment of the present invention.
Figure 9B:
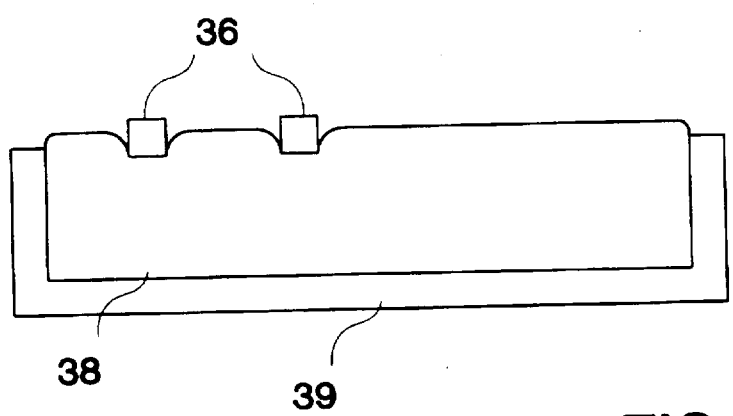
Figure 9C:
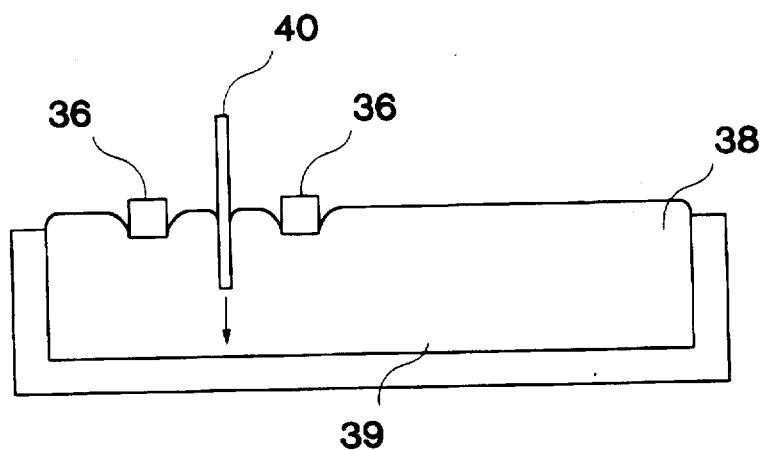

FIG. 9 shows fixing the protein on a substrate by Langmuir-Blodgett's technique. As shown in FIG. 9(a), 100 μl of solution mixed with total 0.2 mg/ml of three kinds of protein having about the same weight were dropped on clean solution 38 using micro syringe 35. The surface area between two barriers 36, 36 was about 400 cm$^2$. Barrier 36 is not limited specially, but can be a stick or the alike with a square section, and made of fluorine resin etc. usually. 37 shows a protein solution. 39 is a vessel. Next, as shown in FIG. 9(b), the distance between the two barriers 36 and 36 were reduced to compress the protein film on the water surface up to 16 m N/m of surface tension. Finally, as shown in FIG. 9(c), barrier-movement feed-back was applied in order to maintain a constant surface tension. The substrate 40 was inserted into clear solution 38 vertically and taken out.

As a substrate, a glass plate, silicone wafer, graphite substrate or mica with hydroxyl groups at the surface were reacted in a solvent (for example, 80 wt. % hexadecane 12 wt. % chloroform, 8 wt. % carbon tetrachloride) including 1 wt. % stearyl trichlorosilane for two hours and made hydrophobic.

The above operations can fix three kinds of serum-albumin on a substrate.

3-4. A method for fixing a substrate with bovine serum-albumin:

Bovine serum-albumin is fixed on a substrate in the same way as in 3-3.

4-1.: A method for fixing single stranded DNA on substrate:

4-1-1. Adsorption method:

10–50 μg/ml of single stranded DNA is dropped on a cleaned flat graphite substrate, a glass substrate, or a glass substrate coated with gold or mica. These substrates are dipped in a DNA solution and single stranded DNA is fixed on these substrates. After that, these substrates are cleaned with water for measurement.

4-1-2. Chemical bonding method:

As substrates, a silicone substrate with an oxidize film, a graphite substrate with an oxidized surface, a mica substrate or a flat surface substrate with hydroxyl groups like a glass substrate are used. About 10 μg of single stranded DNA are added to 50 ml 5–50 wt. % hydrochloric acid.

Next, the substrate is inserted into the DNA solution and reacted at room temperature for several hours. The single stranded DNA is fixed on the substrate. The substrate is cleaned with distilled water and dipped in distilled water again for measurement.

4-1-3. Chemical bonding method: (Chemical absorption method)

As substrates, a silicone substrate with an oxidized film, a graphite substrate with an oxidized surface, a mica substrate or a flat surface substrate with hydroxyl groups like a glass substrate are used. First, 1 wt. % of a silane coupling agent esterified with toluenecarbonic acid

[CH$_3$—C$_6$H$_4$—OOC—(CH$_2$)$_n$—SiCl$_3$]

(where n represents 0 to 25, preferably in a range of 10 to 20) is dissolved in a mixed solvent (80 vol. % hexadecane, 12 vol. % chloroform, 8 vol. % carbon tetrachloride). The substrate is placed in this solution and reacted in a nitrogen atomosphere for two hours. Next, the substrate is dipped in two cells of chloroform solution for 15 minutes each, then cleaned with water.

Then, the above substrate is reacted in an ether solution including for example 1.0 wt. % (10 mg/ml) of lithium aluminume hydride (LiAlH$_4$ ) at room temperature for 20 minutes. Finally, this substrate is placed in 50 ml of a 5–50 wt. % hydrochloric acid solution containing about 10 μg of single stranded DNA and reacted at room temperature for several hours. It is cleaned with distilled water and single stranded DNA is fixed on the substrate.

4-1-4. Chemical bonding method: (Chemical absorption method)

As substrates, a silicone substrate with an oxidized film, a graphite substrate with an oxidized surface, a mica substrate or a flat surface substrate with hydroxyl groups like a glass substrate are used.

First, 1 wt. % of a silane coupling agent

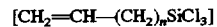

[CH$_2$=CH—(CH$_2$)$_n$SiCl$_3$]

(where n represents 0 to 25, preferably in a range of 10 to 20) with a vinyl group at one end was dissolved in a mixed solvent (80 vol. % hexadecane, 12 vol. % chloroform, 8 vol. % carbon tetrachloride). The substrate is placed in this solution and reacted in a nitrogen atomosphere for two hours. Next, the substrate is dipped in two cells of chloroform solution for 15 minutes each, then cleaned with water.

Next, this substrate is dipped in a 1M tetrahydrofuran solution containing diborane and reacted in an argon atomosphere at room temperature for one minute Finally, this substrate is placed in 50 ml of a 5–50 wt. hydrochloric acid solution containing about 10 μg single stranded DNA and reacted at room temperature for several hours. It is cleaned with distilled water and single stranded DNA is fixed on the substrate.

4-2 A method for fixing a molecule on a probe of AFM:

4-2-1. A method for fixing four kinds of bases of DNA on a probe of AFM: A probe of AFM made from silicone nitride or silicone oxide is used.

To prepare a silicone nitride probe, a probe can be oxidized by alkali treatment, by sodium hydroxide treatment by heated nitric acid, by treatment with heated sulfuric acid or heat treatment in an oxygen atomosphere. After oxidizing, hydroxyl groups are added on the surface.

At least four kinds of nucleotides can be used in the preparation of DNA.

The nucleotides are fixed on a probe in the same way as in 4-1-2 to 4-1-4, but a probe of AFM is used as a substrate.

4-2-2. A method for fixing four kinds of bases of RNA on a probe of AFM:

A probe of AFM is made from silicone nitride or silicone oxide.

To prepare a silicone nitride probe, a probe can be oxidized by alkali treatment, by sodium hydroxide treatment, by heated nitric acid treatment, by heated sulfuric acid, or by heat treatment in an oxygen atomosphere. After oxidizing, hydroxyl groups are added on the surface.

At least four kinds of nucleotides can be used in the preparation of RNA. The nucleotides are fixed on a probe in the same way as in 4-1-2 to 4-1-4, but a probe of AFM is used as a substrate.

Concrete embodiments are as follows:

EXAMPLE 1

Analysis of a substance surface utilizing differences of electronegativity between or among chemically sensitive groups:

Using the method in 1-2-3, molecules with a trichloromethyl group ($-CCl_3$) at one end were fixed on a probe of AFM. A substrate with a vinyl group and an alcohol group was made by the method in 3-2 for sample measurement.

The distance was adjusted between the probe and the sample to make the force between them unchangeable. The probe scanned the sample surface at an atomic level of precision (precision of a few angstroms in this case). At this time, the traces of the probe correspond to the surface structure, and showed many irregularities at the molecular level.

Consequently, it was found that there were vinyl groups in dents and alcohol groups on protruding areas. The difference in electronegativity between the alcohol groups (3.89) and trichloromethyl groups (3.03) was larger than the difference between the vinyl groups (3.08) and trichloromethyl groups on the probe. Therefore, the force between the probe and the alcohol groups was larger than the force between the probe and the vinyl groups.

EXAMPLE 2

Measurement of protein distribution, utilizing antigen-antibody reaction: Antibody specific for bovine serum-albumin was fixed on a probe of AFM by the method stated in 1-2-10.

A substrate fixed with three kinds of serum-albumin was made by the method in 3-3. The distance between the probe and the sample were addjusted to make the force between them constant. The probe scanned the sample surface at an atomic level of precision.

At this time, the traces of the probe correspond to the surface structure, and showed many irregularities at the molecular level.

Consequently, it was found that there were molecules of bovine serum-albumin on the protruding areas. Because the antibody on the probe interacted strongly with the antigen, the distance between the probe and the sample decreased.

EXAMPLE 3

Analysis of a sample surface using an enzyme reaction: Alcohol dehydrogenase was fixed on a probe of SEM by the method stated in 2-2-1.

A substrate with vinyl groups and alcohol groups was made by the method stated in 3-2.

0.1M phosphate buffer solution (pH=7.0) was mixed with 10 mM nicotinamide-adenine dinucleotide ($NAD^+$); a coenzyme of alcohol dehydrogenase and 200 μM Meldola's Blue (See below as $MB^+$; The structual formula 4 is shown below)

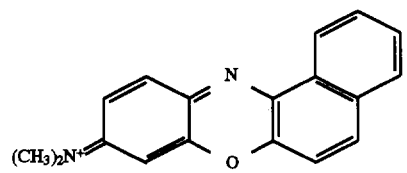

[Formula 4]

A sample substrate, a probe for SEM, a platinum plate electrode, and a silver/chlorosilver reference electrode were inserted in the above-mentioned solution, with the probe as an active electrode and the platinum plate as a counter working electrode.

An electrical potential of the sample substrate was not specially set. First, an electric potential of the probe for SEM was set at 50 mV for the reference electrode and the probe contacted the sample surface. Next, the probe scanned the sample surface at an atomic level of precision, measuring the electric current through the probe. The scanning showed many differences in electric current values at various places. And it was found that there were alcohol groups in places with extraordinarily stronger electric current than with others on the sample. The reason is as follows:

When the probe contacts alcohol groups, alcohol dehydrogenase of the probe oxidizes the alcohol group to an aldehyde group.

This reaction reduces $NAD^+$ to NADH. Reduced NADH is oxidized by Meldola's Blue to be $NAD^+$. Reduced Meldola's Blue ($MB^+$) is oxidized by the probe due to the electric current. Consequently, when the probe contacts the alcohol group, the electric current value becomes stronger than when the probe contacts the vinyl group, showing the location of the alcohol group. This state is shown below.

$$R-CH_2OH + NAD^+ \longrightarrow R-CHO + NADH + H^+ \quad [Formula 5]$$

$$NADH + MB^+ \longrightarrow NAD^+ + MBH \quad [Formula 5]$$

$$MBH \longrightarrow MB^+ + H^+ + 2e^- \quad [Formula 7]$$

EXAMPLE 4

Analysis of substrate surface utilizing adsorption force differences between molecules: Octadecylsiltrichlorosilane $$[CH_3(CH_2)_{17}SiCl_3: OTS]$$

was fixed on the probe for AFM by the method stated in 1-2-1.

Figure 10:
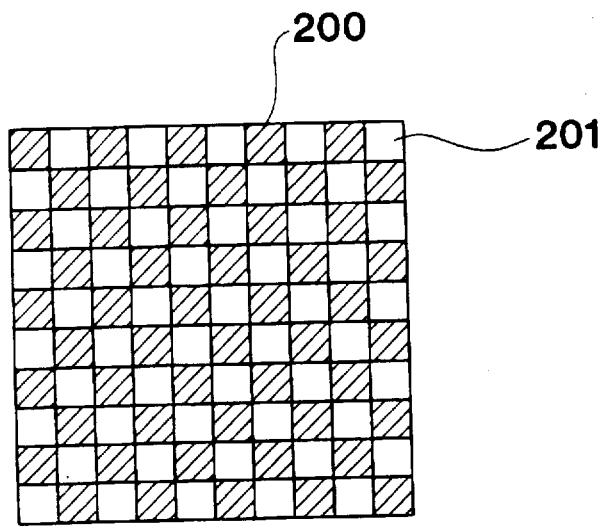
FIG. 10 shows that OTS and TTS are made in a cross striped pattern of 10 μm square on a silicone substrate covered with an oxidized film; and shows an embodiment of the present invention.

As shown in FIG.10, cross striped patterns of 2 μm square each were produced on a silicone substrate covered with oxidized film by OTS and $[CH_3(CH_2)_{13}SiCl_3]$(TTS). The measurement was made in an ethanol solution. Examination of the adsorption force between the OTS on the probe and the OTS or TTS on the silicone substrate could distinguish surface distribution of OTS and TTS.

The measurement was:

The area for measuring the sample was 10 μm². After measuring the force curve at the first point on the sample, the probe separated the sample once, and was moved five nanometers to another place and the force curve was measured again, and repeated at other places. The operation could examine the adsorption force distribution within a 10 μm² area.

Figure 11:
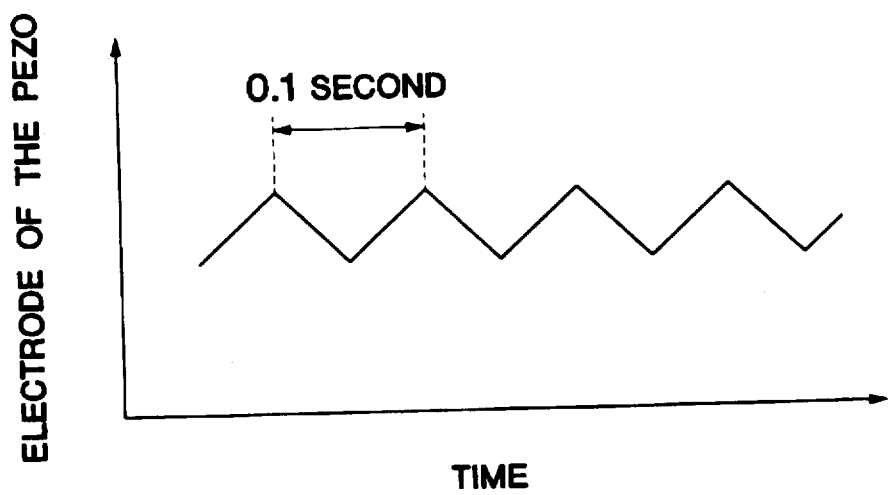
FIG. 11 shows a voltage applied to a piezoelectric element which controls Z axis direction on a measuring force curve; and shows an embodiment of the present invention.

The method for measuring the force curve and for reading the data are as follows: A force curve can be obtained by measuring the force on a probe, moving a sample only in the Z direction, and fixing the X,Y directions. As shown in FIG. 11, a voltage applied by a piezoelectric element which controls the Z direction of the sample is made in triangular waves and travels about 300 nanometers in width in the Z direction.

As a result, the probe moves alternately near to and apart from the sample.

Figure 12:
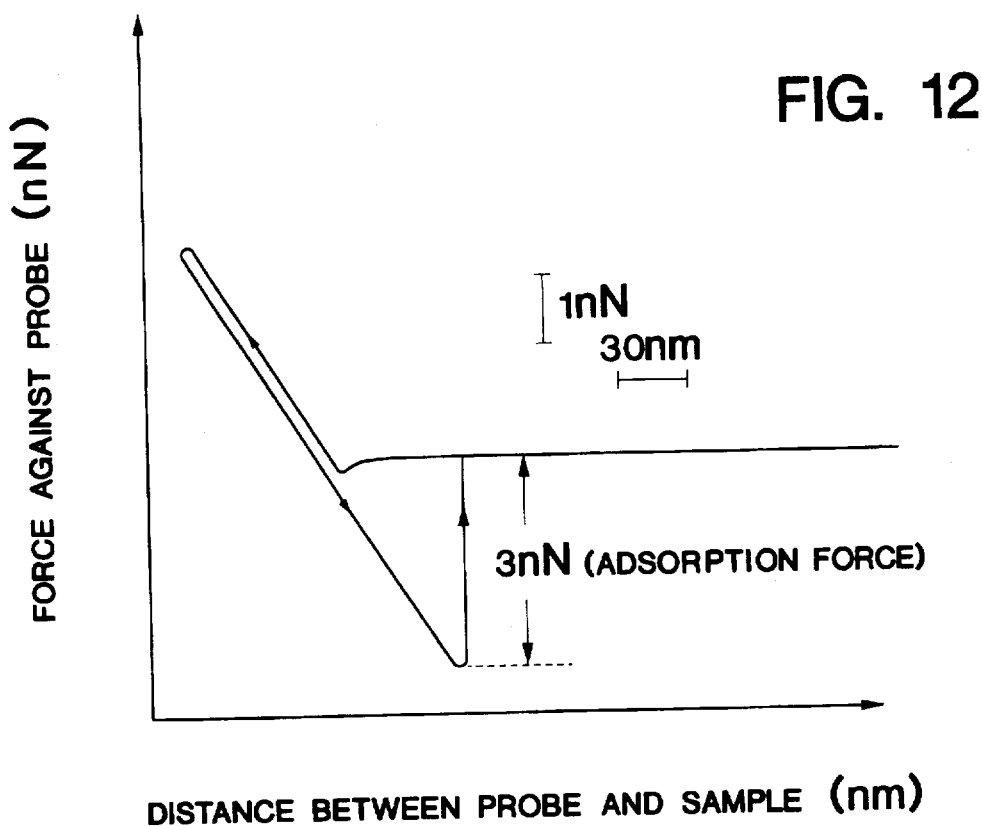
FIG. 12 shows a typical force curve; and shows an embodiment of the present invention.
Figure 13:
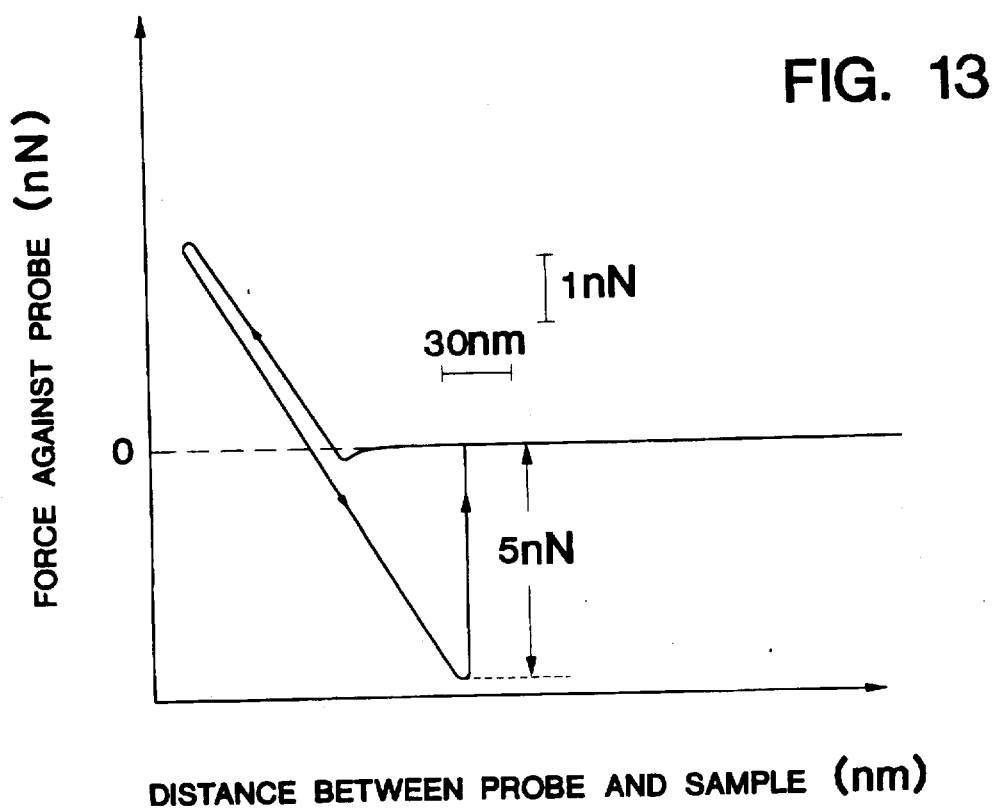
FIG. 13 shows a measured force curve; and shows an embodiment of the present invention.
Figure 14:
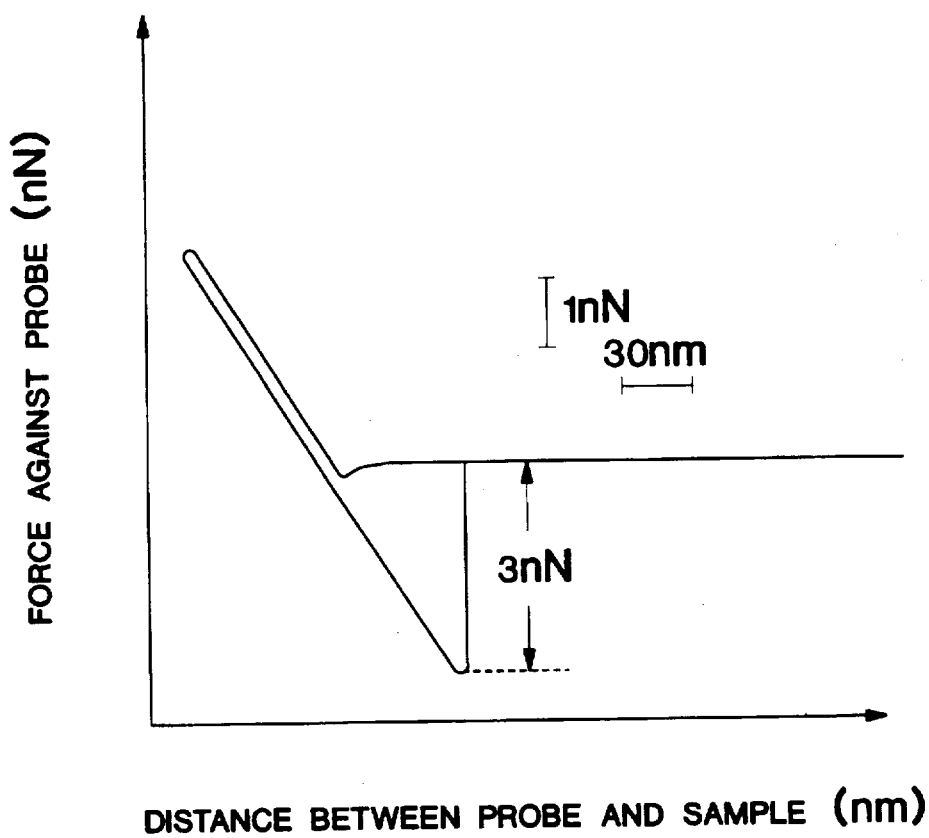
FIG. 14 shows a measured force curve; and shows an embodiment of the present invention.

FIG. 12 shows a typical force curve. The X axis is the distance between the probe and the sample. The 0 point on the X axis means 0 Volt on the piezoelectric element (not shown in FIG. 12). The Y axis shows the force against the probe. At the 0 point, the probe does not receive a force from the sample. The upper side is a repulsive force and the lower side is an attractive force. Force curves generally show hysteresis the arrow in the figure indicates the direction of movement. In this figure, the adsorption force between the probe and the sample is 3 nN. The below is the result of this embodiment. Two types of force curves were observed as in FIG. 13 and FIG. 14.

Figure 15:
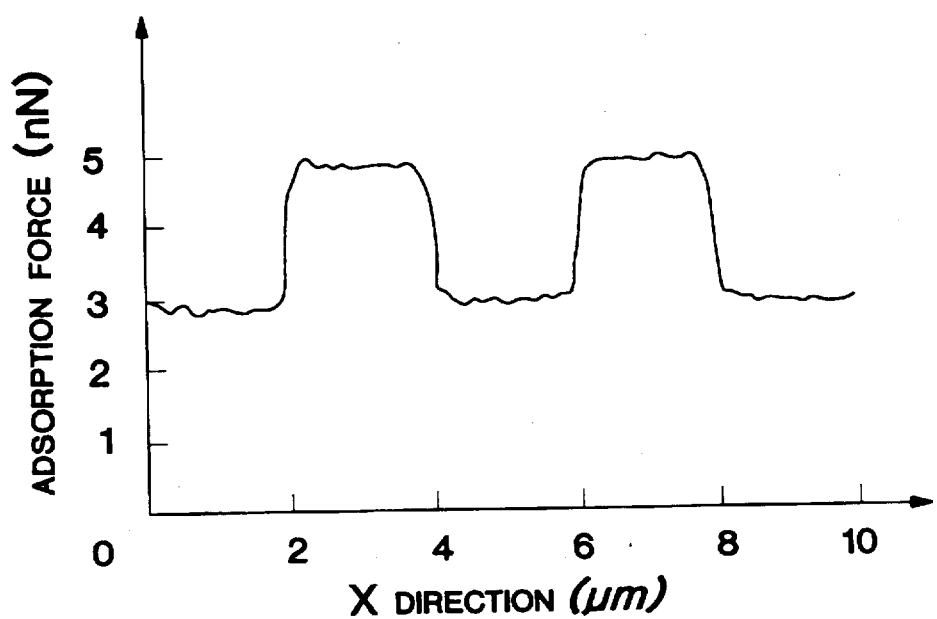
FIG. 15 shows adsorption force dependence on X direction when fixing Y direction; and shows an embodiment of the present invention.
Figures 16A, 16B, 16C:
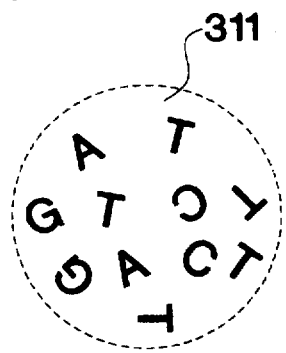
FIGS. 16(a), 16(b) and 16(c) collectively constitute a conceptual drawing showing the conventional use in the prior art of a single stranded DNA template to produce double stranded DNA.
Figure 17A:
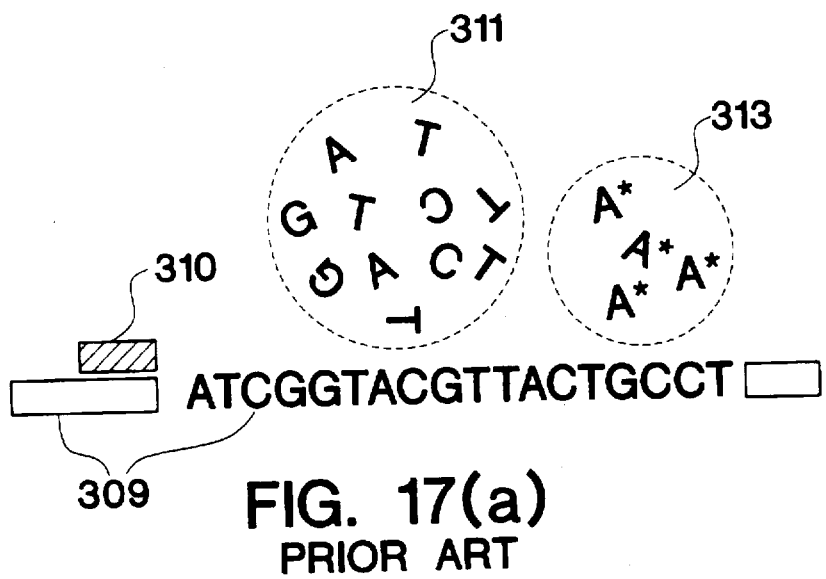
FIGS. 17(a), 17(b) and 17(c) collectively show a method of producing double stranded DNA of various lengths having adenine at one end.
Figure 17B:
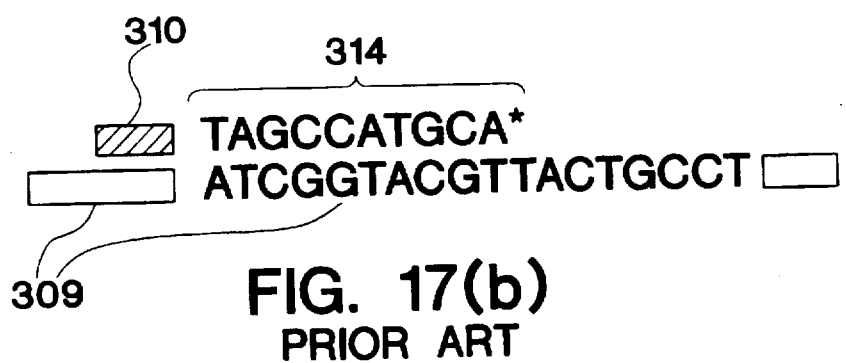
Figure 17C:
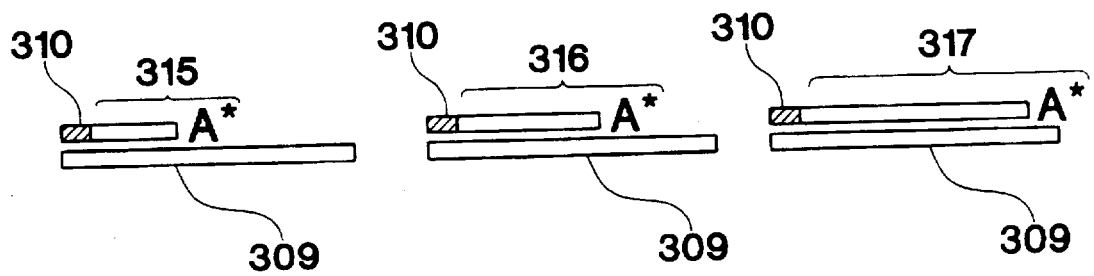
Figure 18:
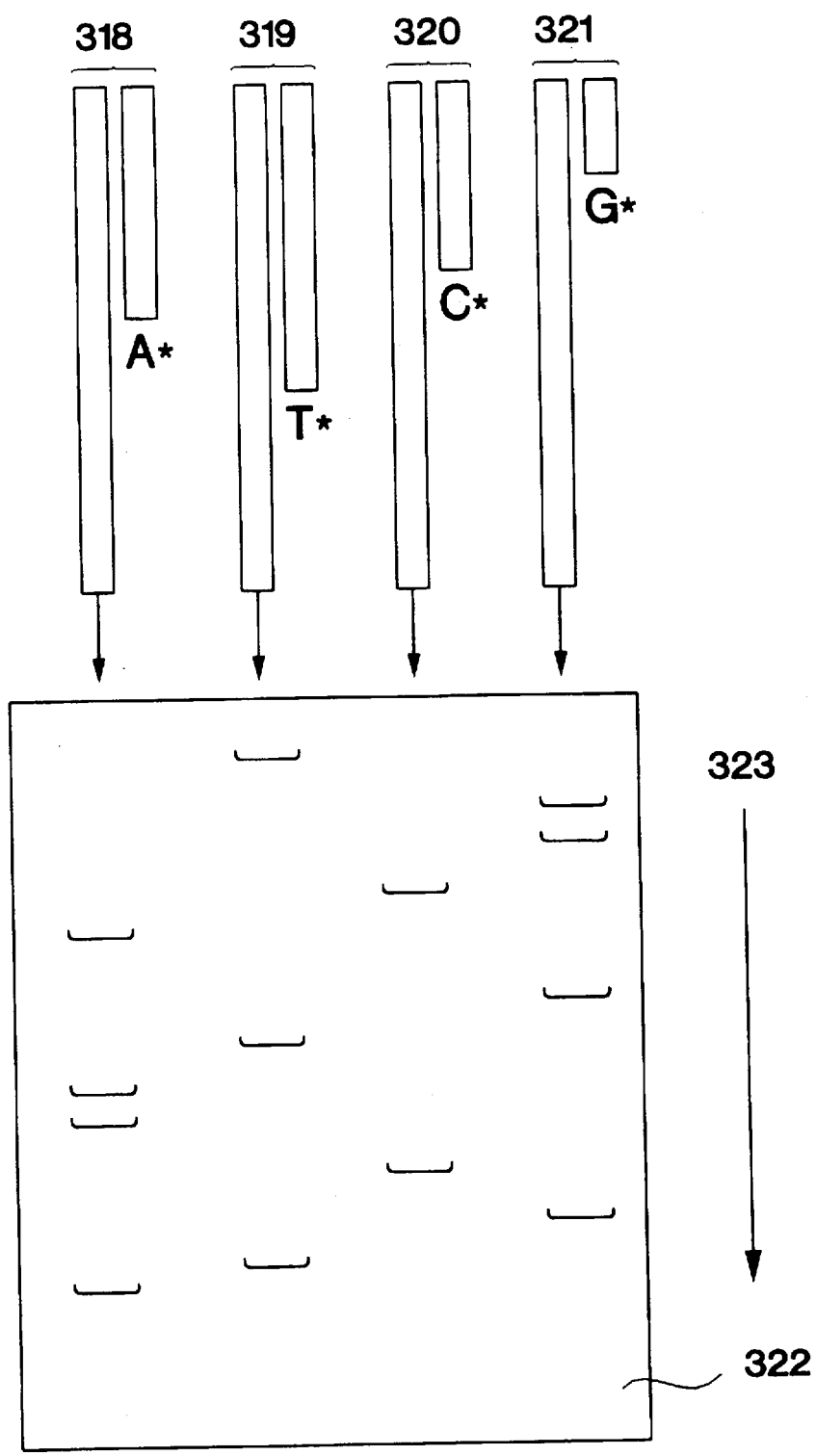
FIG. 18 shows an electrophoresis pattern of four kinds of DNA in mixed solution observed by autoradiography, which is used in the prior art.

The adsorption forces were 5 nN and 2 nN respectively. FIG. 15 shows adsorption force dependence on the X direction with the Y direction being fixed, which exhibits adsorption force variations in every 2 μm.

Adsorption force was measured between a probe with OTS and a sample with OTS on a silicone substrate covered with oxidized film or with TTS.

The method was the same as the above.

The result was 5 nN or 3 nN in the sample with OTS or TTS respectively. The result showed that there were OTS in the places having a strong adsorption force and TTS in weakly adsobing areas, as in FIG. 15. Therefore, surface distribution of adsorption forces between a sample substrate and a probe can distinguish between TTS and OTS on a substrate. The measurement showed that the OTS and TTS were made in 10 μm cross striped patterns on the substrate.

The above has proved to be able to analyze substance structure.

EXAMPLE 5

The example describes a molecular manipulation utilizing an enzyme reaction (Molecule processing method).

Alcohol dehydrogenase was fixed on a probe for AFM by the method stated in 1-2-15 (1-2-10 specifically). A substrate with alcohol groups exposed at the surface was made by the method stated in 3-2. 0.1M of a phosphate buffer solution (pH=7.0) was mixed with 10 mM nicotinamide adenine dinucleotide ($NAD^+$); and a coenzyme of alcohol dehydrogenase was prepared.

First, the surface shape of a sample was examined to determine the place to be processed by a probe fixed with nothing for conventional AFM. Then, based on the sample shape data, the AFM tip with alcohl dehydrogenase was brought near the surface to be processed. After that, the probe scanned the sample surface at an atomic level of precision, measuring the atomic force. And the probe contacted the sample surface at specific positions, thus scanning slowly at atom level of precision. Once, apart from the sample, the probe was scanned again, measuring the force. The same operations were repeated in other places. As a result, the alcohol groups on the sample surface were changed to aldehyde groups, only where the probe was contacted during scanning.

The above method proved to be able to process substrate surfaces at an atomic level.

EXAMPLE 6

(Molecular manipulation utilizing enzyme reaction)

Peptidase was fixed on a probe for AFM by the method stated in 1-2-16 (1-2-10 specifically). And bovine serum-albumin was fixed on a substrate by the method stated in 3-4. First, the surface shape of a the substrate was examined to decide the place to be processed by a probe fixed with nothing for conventional AFM.

Then, based on the sample shape data, the AFM probe with peptidase was brought near the surface to be processed. After that, the probe scanned the sample surface at an atomic level of precision, measuring the atomic force. And the probe contacted the sample surface at specific positions, thus scanning slowly at an atomic level of precision. Once, apart from the sample, the probe scanned it again, measuring the force. The same operations were repeated in other places. As a result, bovine serum-albumin on the sample surface were hydrolyzed only where the probe was contacted during scanning The above method proved to be able to process substrate surfaces at the molecular level.

EXAMPLE 7

(Molecular manipulation utilizing an enzyme reaction)

Alcohol dehydrogenase was fixed on a probe for SEM by the method stated in 2-2-1. And a substrate with alcohol groups exposed at the surface was made by the method stated in 3-2. 0.1M of a phosphate buffer solution (pH=7.0) was mixed with 10 mM nicotinamide adenine dinucleotide ($NAD^+$); a coenzyme of alcohol dehydrogenase and 200 μM Meldola's Blue were prepared.

A sample substrate, a probe of SEM, a platinum plate electrode, a silver/chlorosilver reference electrode were inserted in the above solution with the probe as a working electrode and the platinum plate as a counter electrode. The electric potential was not set specifically.

A probe of SEM was positioned on a specific sample surface, while watching through an optical microscope. And the electric potential of SEM probe was set at 50 mV for the reference electrode and the probe approached the sample surface. Then, the probe scanned the sample surface at an atomic level of precision, measuring the electric current through the probe. The probe contacted the sample surface at specific positions, thus scanning slowly at an atomic level of precision. Once, apart from the sample, the probe scanned it again, measuring the electric current. The same operations were repeated in the other places.

The result of these operations showed that a stronger electric current was exhibited when the probe contacted the surface. As shown in Example 3, when the probe contacted the sample surface, alcohol groups were oxidized by alcohol dehydrogenase on the probe. Therefore, it was confirmed that alcohol groups on the surface were changed to aldehyde groups only where the probe contacted the substrate.

The above proved that this method could process surface structure at an atomic level.

A high degree of information was able to be written on the solid surface in the present invention. In other words, the possibility of writing information can be utilized as memory storage, by changing the structure of the solid surface where there are only alcohol groups at the microscopic region by the above method and by making changes in the solid surface patterns of the structure.

EXAMPLE 8

DNA of colon bacilli of about 30 base pairs were cut, removed and detected by the method of the present invention. The details are as follows. First, colon bacilli DNA of 30 base pairs was mixed in a solution of 15 mM sodium chloride and 1.5 mM sodium citrate so as to obtain a concentration below 20 μ/mg. After boiling this solution, the colon bacilli DNA was dipped in it for 10 minutes, and then cooled in ice water rapidly to form single stranded DNA.

This single stranded DNA was scattered and fixed on a graphite substrate using the method stated in 4-1-1. DNA nucleotides were fixed on a probe for AFM, using the method stated in 4-2-1 (4-1-3 specifically). The probe which was fixed with nucleotides including adenine approached the substrate surface which was fixed with single stranded DNA. The distance between the probe and the substrate surface was adjusted so that the force between the probe and the substrate surface was constant. The surface was scanned at an atomic level of precision (about 0.1 nanometer). The scanning area of the probe was 100×100 nm². The traces of the probe was examined. The traces correspond to the shape or the structure of the surface.

Upon examination, the single stranded DNA fixed to the graphite substrate was in the shape of a stick and was about 1 nm in diameter. This stick shaped DNA contained seven protruding regions. When compared to a conventional AFM, the stick shape was also observed. However, no protruding regions were present. This analysis was performed as follows.

Fixing single stranded DNA according to the method state in 4-4-1, generally result in DNA which gives the appearance of a stick. Using the method of this invention to rrobe the fixed single stranded DNA, protruding regions are formed. Tree protruding regions are due to specific interractive force between the interactive moleculs on the probe and the substrate DNA. For example, the force between adenine fixed on the probe and thymine on the DNA substrate is stronger than the force between the adenine fixed on the probe and any other base of the DNA substrate. Therefore, when the probe come into the proximity with the thymine base of the DNA substrate, a strong force occures. The distance between the probe and the DNA substrate is then increased in order to maintain a constant force between the probe tip and the substrate surface. Due to the interaction between the adenine and thymine, a protruding region develops as the distance between the probe and the substrate is increased. Consequently, the protruding areas on the DNA substrate represent the nucleic acid basethymine. Seven thymine positions were distinguished in this substrate.

Next, three kinds of probes respectively with nucleotides of thymine, guanine or cytosine were used to examine the position of adenine, cytosine or guanine on DNA, using the above operations.

Four kinds of probes were used to detect the position of bases in DNA and thus the 30 DNA base pair arrangement of the colon bacilli were determined. Only three kinds of probes fixed with nucleotides including, for example, any of thymine, guanine or cytosine are needed to detect DNA base arrangemet however.

The examination of single stranded DNA by three kinds of probes were used to distinguish the positions of adenine, cytosine or guanine on DNA by observation of the protruding regions of the DNA. Where there are no protrusions, thymine exists here; and the numbers of thymine molecules can be examined from the dimensions. Thus, DNA base arrangement of colon bacilli consisting of 30 base pairs can be detected.

EXAMPLE 9

DNA base arrangement of colon bacilli having of 30 base pairs are detected by fixing single stranded DNA on a mica substrate by the method stated in 4-1-3, and otherwise as in Example 8.

EXAMPLE 10

DNA base arrangement of colon bacilli having of 30 base pairs are detected by fixing single stranded DNA on a mica substrate by the method stated in 4-1-3, and by fixing nucleotides of DNA on an AFM probe by the method stated in 4-2-1 (4-1-2- specifically), and otherwise as in Example 8.

EXAMPLE 11

DNA base arrangement of colon bacilli having 30 base pairs are detected by fixing nucleotides of RNA on an AFM probe by the method stated in 4-2-2 (4-1-3 specifically) and otherwise as in Example 8.

EXAMPLE 12

DNA base arrangement of colon bacilli having 30 base pairs are detected by fixing single stranded DNA on mica substrate by the method stated in 4-1-3, and by fixing nucleotides of RNA on an AFM probe by the method stared in 4-2-2 (4-1-3 specifically) and otherwise as in Example 8.

EXAMPLE 13

DNA base arrangement of colon bacilli having 30 base pairs are detected by fixing single stranded DNA on a mica substrate by the method stared in 4-1-3, and by fixing nucleotides of RNA on an AFM probe by the method stated in 4-2-2 (4-1-2- specifically) and otherwise as in Example 8.

Surface structure can be examined or processed directly at the molecular or atomic level easily, using a specific probe, if practiced in operating a scanning probe microscope as in the present invention. DNA base arrangement can be detected by this scanning probe microscope.

This invention can bring a revolutionary profit to the fields of analytical chemistry and synthetic chemistry as surface structure can be examined or processed directly at the molecularr atomic level. This invention can provide an important technology to such a field.

In the above embodiment, only AFM and SEM were used as a scanning probe microscope. But, needless to say, surface structere of substances can be examined or processed directly at the molecular or atomic level by fixing molecules or atom group as a sensor on a probe for a scanning probe microscope, like a scanning tunneling microscope (to detect tunneling current). Quick determination of DNA base arrangement is very important in the fields of molecular biotechnology, medicial science, criminal medicine, agriculture, forestry, fisheries and pharmaceutical companies.

Medical treatment of genetic diseases, improvement of plants by genetic engineering, and the production of useful biological substances require DNA base analysis as a basic technology.

The necesity increases more and more.

This invention is easier to operate and requires less DNA than any conventional process or apparatus.

Now, the human genomic DNA project is planning to determine the arrangement of all human DNA. The development of means for reading base sequence rapidly and accurately is strongly desired, as human DNA contains about 2.8 billion base pairs.

This invention is expected to be one of the leading means.

It is needless to say that though the above is achieved by fixing four kinds of nucleotides of DNA or RNA on a probe of an AFM, anything interacting with a base of DNA is within the scope of this invention.

As shown the above in embodiments, this invention can provide a scanning probe microscope in which the surface structure of a substance can be microscopically examined and processed at the molecular or atomic level.

It is possible to examine or process directly substance surface structure consisting of a variety of atoms, because molecules or atom groups fixed on a probe can interact or chemically react with molecules or atom groups of substance surfaces very strongly.

As the scanning prove microscope is an atomic force microscope (AFM) and the physical quantity to be detected is atomic force, it is possible to examine or process directly the structure of a substance surface easily, even though the sample is non-conductive. Also, as the scanning probe microscope is a scanning electrochemical microscope (SEM) and the physical quantity to be detected is electric current, it is possible to examine or process directly the structure of a substance surface easily, even Though electrochemical variation without any force interaction occurs. Next, the method for processing molecules of a substance surface in the present invention can process surface structure within the microscopic region, by easy operation without necessity of protective groups used in the prior art.

It is possible to process directly the structure of surfaces having a variety of atoms, because molecules or atom groups fixed on a probe can interact or chemically react with molecules or atom groups of surfaces strongly.

Also, as the scanning probe microscope is a scanning electrochemical microscope (SEM) and the physical quantity of interaction between molecules or atom groups fixed on a probe and the molecules or atom groups of the substance surface is an electric current, it is possible to process directly surface structure easily, even though electrochemical variation without any force interaction occurs.

The method for detecting DNA base arrangement in the present invention can be used to detect DNA base arrangement easily, safely and quickly, even with a much smaller quantity of DNA than the conventional methods, —only a piece of DNA is enough for measuring, since a radioactive agent is not used.

In this invention, it is easy to determine DNA base arrangement, because fixing a sample to a substrate and fixing a molecule to a probe can be performed in almost the same way, by providing favorable conditions and predictable chemical interactions.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A scanning probe microscope comprising a probe approaching or contacting a substance surface to detect a physical quantity between the substance surface and the probe, wherein the physical quantity is what is chemically reacted between the substance surface and molecules or atom groups which act as a sensor are fixed on the probe, and the probe is scanned at an atomic level of precision, wherein the scanning probe microscope is a scanning electrochemical microscope and the physical quantity to be detected is an electric current.

2. A method for processing molecules of a substance surface at the molecular or atomic level comprising chemically reacting molecules or atom groups of the substance surface with molecules or atom groups fixed to the scanning probe and detecting a physical quantity which is measured through the probe by approaching or contacting the substance surface, wherein the molecules are processed with a scanning electrochemical microscope and the physical quantity to be detected is an electric current.

3. A scanning probe microscope according to claim 1, wherein the molecules, which act as a sensor, and the probe are covalently bonded to each other.

4. A scanning probe microscope according to claim 3, wherein the molecules which act as a sensor form a chemically adsorbed film.

5. A scanning probe microscope according to claim 1, wherein the molecules which act as a sensor are contained in a metal electrodeposited on the surface of the probe.

6. A method according to claim 2, wherein the molecules, which act as a sensor, and the probe are covalently bonded to each other.

7. A method according to claim 6, wherein the molecules which act as a sensor form a chemically adsorbed film.

8. A method according to claim 2, wherein the molecules which act as a sensor are contained in a metal electrodeposited on the surface of the probe.

* * * * *